(12) United States Patent
Sarawgi et al.

(10) Patent No.: US 11,010,693 B2
(45) Date of Patent: May 18, 2021

(54) DETERMINING AND PROVIDING PREDETERMINED LOCATION DATA POINTS TO SERVICE PROVIDERS

(71) Applicant: Uber Technologies, Inc., San Francisco, CA (US)

(72) Inventors: Aditya Sarawgi, San Francisco, CA (US); Sophia Cui, San Francisco, CA (US); Matthew Sweeney, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 890 days.

(21) Appl. No.: 14/818,053

(22) Filed: Aug. 4, 2015

(65) Prior Publication Data

US 2016/0034828 A1    Feb. 4, 2016

Related U.S. Application Data

(60) Provisional application No. 62/033,013, filed on Aug. 4, 2014.

(51) Int. Cl.
*G06Q 10/02* (2012.01)
*G06Q 50/30* (2012.01)
*G06Q 10/00* (2012.01)

(52) U.S. Cl.
CPC ............ *G06Q 10/02* (2013.01); *G06Q 10/00* (2013.01); *G06Q 50/30* (2013.01)

(58) Field of Classification Search
CPC ......... G06Q 10/02; G06Q 10/00; G06Q 50/30
(Continued)

(56) References Cited

U.S. PATENT DOCUMENTS 5,168,451 A    12/1992  Bolger
5,557,522 A    9/1996   Nakayama
(Continued)

FOREIGN PATENT DOCUMENTS

CN    104575072    4/2015
CN    104931063    9/2015
(Continued)

OTHER PUBLICATIONS

Constine, John. "Uber is Now Testing 'Suggested Pickup Points'". Published Jul. 8, 2015. https://techcrunch.com/2015/07/08/uber-suggested-pickup-points/ (Year: 2015).*
(Continued)

*Primary Examiner* — George Chen
*Assistant Examiner* — Lisa Ma
(74) *Attorney, Agent, or Firm* — Mahamedi IP Law LLP

(57) ABSTRACT

A system and method for arranging a transport service is described. A system can receive a request for transport service from a user device. The request can include a requested pickup location data point. The system determines a predetermined location data point associated with the requested pickup location data point. The first predetermined location data point can be different from the requested pickup location data point. The system selects a driver to perform a transport service for the user based, at least in part, on the requested pickup location data point, and transmits the predetermined location data point to a driver device of the selected driver.

15 Claims, 11 Drawing Sheets

(58) Field of Classification Search
USPC .......................................................... 705/5
See application file for complete search history.

(56) References Cited

U.S. PATENT DOCUMENTS

| | | | |
|---|---|---|---|
| 5,945,919 | A | 8/1999 | Trask |
| 5,948,040 | A | 9/1999 | DeLorme |
| 6,058,339 | A | 5/2000 | Takiguchi |
| 6,212,393 | B1 | 4/2001 | Suarez |
| 6,233,517 | B1 | 5/2001 | Froeberg |
| 6,321,158 | B1 | 11/2001 | DeLorme |
| 6,618,593 | B1 | 9/2003 | Drutman |
| 6,756,913 | B1 | 6/2004 | Ayed |
| 6,925,381 | B2 | 8/2005 | Adamczyk |
| 7,080,019 | B1 | 7/2006 | Hurzeler |
| 7,263,437 | B2 | 8/2007 | Hirose |
| 7,822,426 | B1 | 10/2010 | Wuersch |
| 8,005,488 | B2 | 8/2011 | Staffaroni |
| 8,140,256 | B1 | 3/2012 | dos-Santos |
| 8,554,608 | B1 | 10/2013 | O'Connor |
| 8,565,789 | B2 | 10/2013 | Staffaroni |
| 8,799,038 | B2 | 8/2014 | Chen et al. |
| 9,075,136 | B1 | 7/2015 | Joao |
| 9,158,414 | B1 * | 10/2015 | Gluzberg ............... G06F 3/0488 |
| 9,547,307 | B1 | 1/2017 | Cullinane |
| 9,562,785 | B1 | 2/2017 | Racah |
| 9,599,477 | B1 | 3/2017 | Aula |
| 9,613,386 | B1 | 4/2017 | Arden |
| 9,631,933 | B1 * | 4/2017 | Aula ..................... B60W 30/06 |
| 9,715,233 | B1 | 6/2017 | Mandeville-Clark |
| 9,702,714 | B2 | 7/2017 | Botea |
| 9,733,096 | B2 | 8/2017 | Colijn |
| 2001/0037174 | A1 | 11/2001 | Dickerson |
| 2001/0056363 | A1 | 12/2001 | Gantz |
| 2004/0024789 | A1 | 2/2004 | Ditcharo et al. |
| 2004/0049424 | A1 | 3/2004 | Murray |
| 2004/0107110 | A1 | 6/2004 | Gottlieb et al. |
| 2004/0249818 | A1 | 12/2004 | Isaac |
| 2006/0004590 | A1 | 1/2006 | Khoo |
| 2006/0034201 | A1 | 2/2006 | Umeda et al. |
| 2006/0059023 | A1 | 3/2006 | Mashinsky |
| 2006/0200306 | A1 | 9/2006 | Adamcyzk |
| 2006/0235739 | A1 | 10/2006 | Levis |
| 2007/0150375 | A1 | 6/2007 | Yang |
| 2007/0233373 | A1 | 10/2007 | Choi et al. |
| 2007/0276595 | A1 | 11/2007 | Lewinson |
| 2008/0055049 | A1 | 3/2008 | Weill |
| 2008/0091342 | A1 | 4/2008 | Assael |
| 2008/0270204 | A1 | 10/2008 | Poykko |
| 2008/0275645 | A1 | 11/2008 | Hoshino |
| 2008/0277183 | A1 | 11/2008 | Huang |
| 2009/0143965 | A1 | 6/2009 | Chang et al. |
| 2009/0156241 | A1 | 6/2009 | Staffaroni |
| 2009/0176508 | A1 | 7/2009 | Lubeck et al. |
| 2009/0192851 | A1 | 7/2009 | Bishop |
| 2009/0216600 | A1 | 8/2009 | Hill |
| 2009/0281844 | A1 | 11/2009 | Probst |
| 2009/0326991 | A1 | 12/2009 | Wei |
| 2010/0042549 | A1 | 2/2010 | Adamczyk |
| 2010/0205017 | A1 | 8/2010 | Sichelman et al. |
| 2010/0292914 | A1 | 11/2010 | Vepsalainen |
| 2011/0000747 | A1 | 1/2011 | Wu |
| 2011/0009098 | A1 | 1/2011 | Kong |
| 2011/0099040 | A1 | 4/2011 | Felt et al. |
| 2011/0153629 | A1 | 6/2011 | Lehmann et al. |
| 2011/0225269 | A1 | 9/2011 | Yap et al. |
| 2011/0301985 | A1 | 12/2011 | Camp et al. |
| 2011/0301997 | A1 | 12/2011 | Gale et al. |
| 2011/0320232 | A1 | 12/2011 | Staffaroni |
| 2012/0004840 | A1 | 1/2012 | Lee |
| 2012/0041675 | A1 | 2/2012 | Juliver |
| 2012/0059693 | A1 | 3/2012 | Colodny et al. |
| 2012/0130627 | A1 | 5/2012 | Islam |
| 2012/0232943 | A1 | 9/2012 | Myr |
| 2013/0054139 | A1 | 2/2013 | Bodin |
| 2013/0073327 | A1 | 3/2013 | Edelberg |
| 2013/0102333 | A1 | 4/2013 | Dam |
| 2013/0132140 | A1 | 5/2013 | Amin |
| 2013/0132246 | A1 * | 5/2013 | Amin ..................... G06Q 40/12 |
| | | | 705/34 |
| 2014/0011522 | A1 | 1/2014 | Lin |
| 2014/0051465 | A1 | 2/2014 | Ruys et al. |
| 2014/0082069 | A1 | 3/2014 | Varoglu et al. |
| 2014/0129135 | A1 | 5/2014 | Holden |
| 2014/0129951 | A1 | 5/2014 | Amin et al. |
| 2014/0365250 | A1 | 12/2014 | Ikeda |
| 2015/0006072 | A1 | 1/2015 | Goldberg |
| 2015/0067878 | A1 * | 3/2015 | Steelberg ................ H04W 4/21 |
| | | | 726/26 |
| 2015/0081362 | A1 | 3/2015 | Chadwick |
| 2015/0143275 | A1 * | 5/2015 | Lee ....................... G06F 3/0482 |
| | | | 715/771 |
| 2015/0161564 | A1 | 6/2015 | Sweeney |
| 2015/0219464 | A1 * | 8/2015 | Beaurepaire ....... G01C 21/3438 |
| | | | 701/538 |
| 2015/0228192 | A1 | 8/2015 | Kawamoto |
| 2015/0248689 | A1 | 9/2015 | Paul |
| 2015/0254581 | A1 | 9/2015 | Brahme |
| 2015/0302342 | A1 | 10/2015 | Yeh |
| 2015/0324717 | A1 | 11/2015 | Lord |
| 2015/0339923 | A1 | 11/2015 | Konig et al. |
| 2015/0339928 | A1 | 11/2015 | Ramanujam |
| 2016/0027306 | A1 | 1/2016 | Lambert |
| 2016/0034828 | A1 | 2/2016 | Sarawgi |
| 2016/0034845 | A1 | 2/2016 | Hiyama |
| 2016/0048804 | A1 | 2/2016 | Paul |
| 2016/0055769 | A1 | 2/2016 | Angelescu |
| 2016/0301698 | A1 | 10/2016 | Katara |
| 2016/0320198 | A1 | 11/2016 | Liu |
| 2016/0321771 | A1 | 11/2016 | Liu |
| 2016/0364678 | A1 | 12/2016 | Cao |
| 2016/0370194 | A1 | 12/2016 | Colijn |
| 2017/0059347 | A1 * | 3/2017 | Flier ...................... H04W 4/029 |
| 2017/0103490 | A1 | 4/2017 | Haparnas |
| 2017/0153714 | A1 | 6/2017 | Gao |
| 2017/0160092 | A1 | 6/2017 | Botea |
| 2017/0169366 | A1 | 6/2017 | Klein |
| 2017/0169535 | A1 | 6/2017 | Tolkin |
| 2017/0193404 | A1 * | 7/2017 | Yoo ....................... H04W 4/024 |
| 2017/0213308 | A1 | 7/2017 | Wellborn |
| 2017/0277191 | A1 | 9/2017 | Fairfield |
| 2017/0286884 | A1 | 10/2017 | Shoval |
| 2017/0293950 | A1 | 10/2017 | Rathod |
| 2017/0300848 | A1 * | 10/2017 | Shoval ............. G06Q 10/06315 |
| 2017/0314948 | A1 | 11/2017 | Racah |
| 2017/0365030 | A1 | 12/2017 | Shoham |
| 2018/0156623 | A1 | 6/2018 | West |
| 2018/0202820 | A1 | 7/2018 | Yu |
| 2018/0202821 | A1 | 7/2018 | Yu |
| 2018/0342035 | A1 | 11/2018 | Sweeney |
| 2018/0356239 | A1 | 12/2018 | Marco |
| 2018/0374032 | A1 | 12/2018 | Pan |
| 2019/0137288 | A1 | 5/2019 | Rahematpura |
| 2019/0306258 | A1 | 10/2019 | Yamashita |

FOREIGN PATENT DOCUMENTS

| | | |
|---|---|---|
| JP | 2010-208195 | 8/1998 |
| JP | 2004-302941 | 10/2004 |
| JP | 2004-362271 | 12/2004 |
| JP | 3934985 | 6/2007 |
| JP | 2012-73995 | 4/2012 |
| JP | 2014-130552 | 6/2014 |
| JP | 2004-073639 | 5/2015 |
| KR | 10-2010-0053717 | 5/2010 |
| KR | 10-2014-0124137 | 10/2014 |
| WO | WO 1999/044186 | 2/1999 |
| WO | WO1999044186 | 9/1999 |
| WO | WO-2002006994 | 1/2002 |
| WO | WO 2005/013588 | 2/2005 |
| WO | WO 2011069170 | 6/2011 |

(56) References Cited

FOREIGN PATENT DOCUMENTS

| WO | WO 2014/074407 | | 5/2014 | |
|---|---|---|---|---|
| WO | WO2014106617 | | 7/2014 | |
| WO | WO-2019037549 | A1 * | 2/2019 | ............ G06Q 50/30 |

OTHER PUBLICATIONS

EESR in EP 15830335.4 dated Nov. 29, 2017.
IPRP in PCT/US2015/043654 dated Feb. 16, 2017.
International Search Report in PCT/US2016/066030 dated Feb. 28, 2017.
ISR in corresponding/related PCT/US2016/016858 dated May 19, 2016.
IPRP in PCT/US2014/069602 dated Jun. 14, 2016.
Alfred Round, et al.: Future Ride: Adapting New Technologies to Paratransit in the United States, UC Transportation Center Berkeley, CA, UCTC No. 306 (1996).
Kikuchi, et al., "Advanced Traveler Aid Systems for Public Transportation", US Department of Transportation, Sep. 1994.
Fu, et al., "On-Line and Off-Line Routing and Scheduling of Dial-a-Ride Paratransit Vehicles", Computer-Aided Civil and Infrastructure Engineering 14 (1999).
International Search Report in PCT/US2015/043654 dated Nov. 26, 2015.
Hai Yang et al. "Equilibria of bilateral taxi-customer searching and meeting on networks", Transportation Research Part B., 2010, vol. 44, pp. 1067-1083.
ISR in corresponding/related PCT/US2015/034831 dated Sep. 24, 2015.
Written Opinion in SG 11201700671P dated Oct. 13, 2017.
International Search Report and Written Opinion issued in PCTUS2016/062344 dated Jan. 31, 2017.
ISR and Written Opinion in PCT/US2018/059230 dated Jan. 2, 2019.
Andrew J. Hawkins, Lyft is now suggesting more convenient pickup locations, because a little walking won't kill you. Jun. 26, 2017 The Verge (www.theverge.com).
Office Action in EP 15830335.4 dated Mar. 21, 2019.
IPRP in PCT/US2016/066030 dated Jun. 21, 2018.
2nd Written Opinion in SG 1120170067W dated Aug. 29, 2018.
ESER in EP 16874019.9 dated Aug. 22, 2018.
ISR and Written Opinion in PCT/US2018/013583 dated Apr. 20, 2018.
Office Action in JP 2017-505856 dated Feb. 6, 2019.
Mark H. Walker, "Microsoft Office Visio 2003 Official Manual", Initial Pressing, Nikkei BP Soft Press, Apr. 4, 2005, First Edition, pp. 423-425.
ISR dated Oct. 3, 2018 in PCT/US2018/039830.
Borison, Rebecca, "Uber Brings its SUV Fleet to NYV", Jul. 30, 2014, Business Insider, p. 1.
Hilen, Brittany, Uber and Google bring WIFI to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326.
Jain, "Contextual Adaptive User Interface for Android Devices", Annual IEEE India Conference (INDICON), IEEE, pp. 1-4 (2013).
IPRP in PCT/US2019/039830 dated Jun. 26, 2019.

* cited by examiner

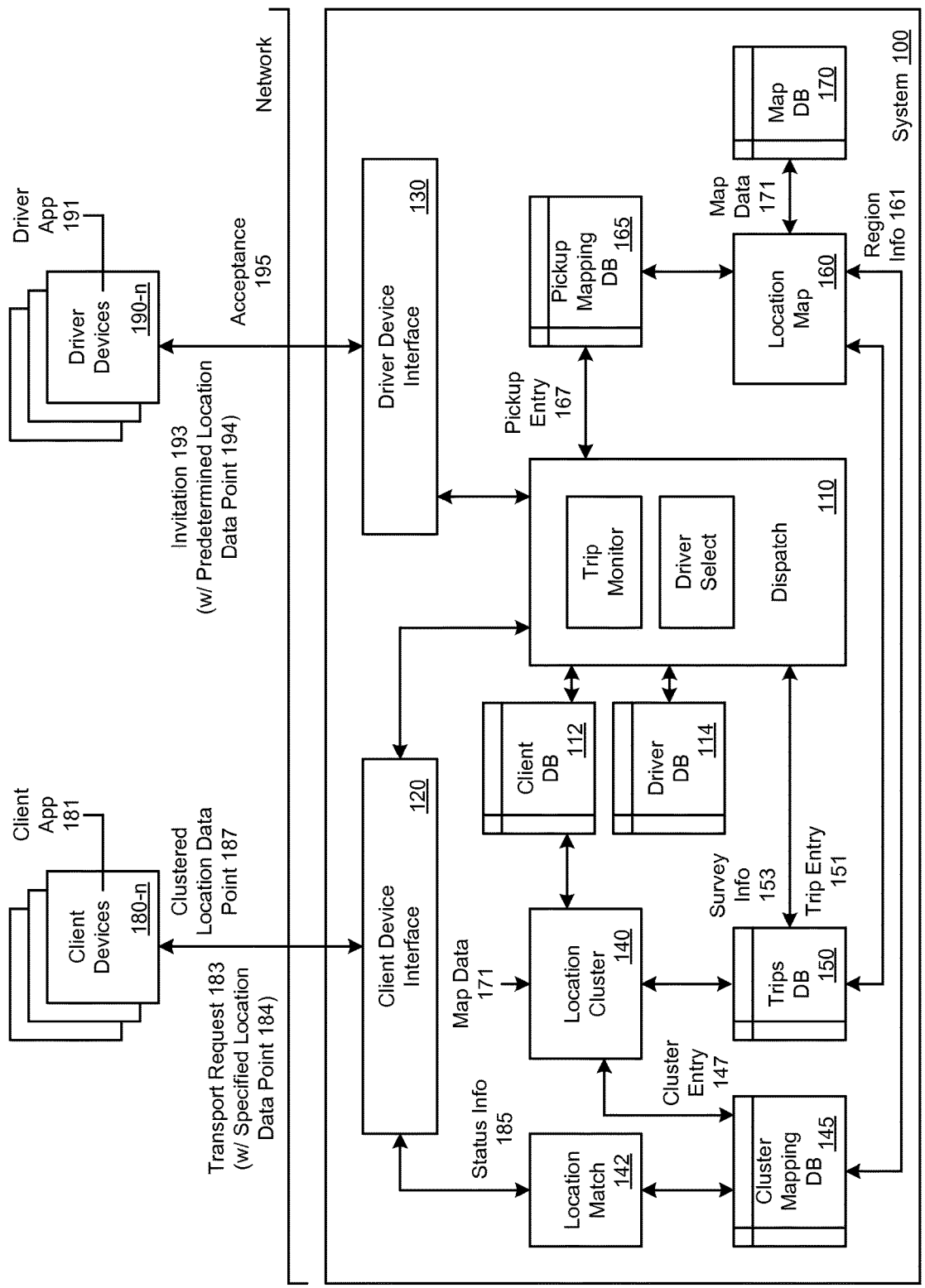

DETERMINING AND PROVIDING PREDETERMINED LOCATION DATA POINTS TO SERVICE PROVIDERS

RELATED APPLICATIONS

This application claims the benefit of U.S. Provisional Patent Application No. 62/033,013, filed Aug. 4, 2014, titled DETERMINING AND PROVIDING PREDETERMINED LOCATION DATA POINTS TO SERVICE PROVIDERS; the aforementioned application being incorporated by reference in its entirety.

BACKGROUND

Systems exist that can arrange for a service to be provided by a service provider through the use of computing devices. For example, a user can make a request for a service using her mobile device and a system can arrange for that service to be provided for the user by selecting a service provider. In many instances, the performance of the service can be dependent on a location specified by the user.

BRIEF DESCRIPTION OF THE DRAWINGS

FIG. 1 illustrates an example system to arrange an on-demand service, under an embodiment.

DETAILED DESCRIPTION

Figure 2A:
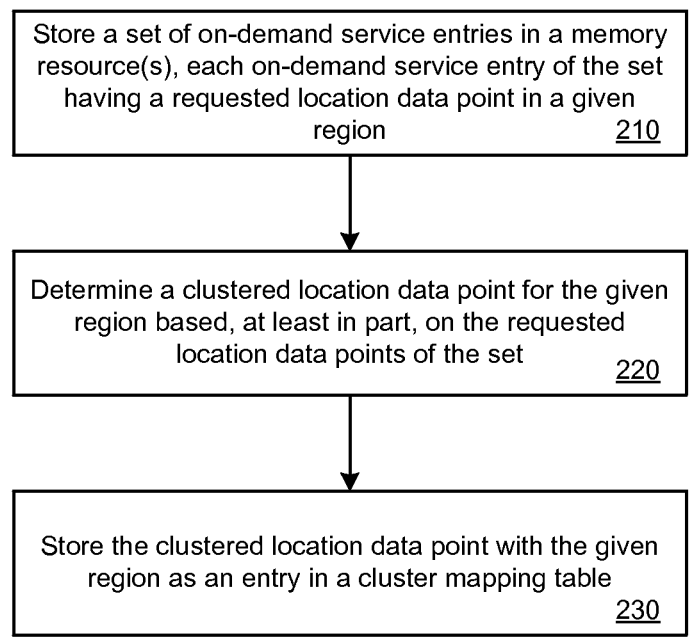
FIG. 2A illustrates an example method for determining a location data point for an on-demand service, according to an embodiment.

Examples described herein provide for a system that assists or guides users and/or service providers to travel to a predetermined or particular location for purposes of fulfilling an on-demand service. The system can use data corresponding to services that have been previously performed in order to determine particular locations that are best suited for initiating performance of on-demand services (e.g., pin point the best location for a user and a service provider to meet). Information corresponding to such a location can be provided to a mobile device operated by a requesting user and/or to a mobile device operated by a selected service provider.

In one example, a transport arrangement system (implemented on or by a computing device, system, or data center) can provide a network service or platform to enable users and service providers to request and receive transport services using their respective computing devices. The system can receive a request for transport service from a user device over one or more networks. The request for transport service can include a requested pickup location data point. The system can identify a predetermined location data point associated with the requested pickup location data point, if any, where the predetermined location data point is different from the requested pickup location data point. For example, the predetermined location data point can correspond to a location that has been determined by the system as being the best-suited location for initiating the transport service for a particular region. The system can select a driver to perform the transport service for the user and transmit an invitation to the selected driver, including the predetermined location data point (e.g., as opposed to the requested pickup location data point).

According to some examples, the system can determine location data points for different regions based on information about previously requested and/or completed transport services. The system can store transport service entries in one or more memory resources, where each transport service entry (also referred to herein as a "trip entry") corresponds to a transport service that has been previously requested and/or completed. For example, a trip entry can include a user identifier of the user that requested the transport service, a driver identifier of the driver that provided the transport service, a requested pickup location data point, an initiated location data point (e.g., the location where the transport service had started), a destination location data point where the transport service was completed, and/or other information, such as the vehicle type, the price, the route taken, etc. As used herein, a location data point can correspond to a latitude and a longitude coordinate that specifies a particular location or position. In other examples, a location data point can correspond to a coordinate in a different type of coordinate system.

The system can determine a set of trip entries that each includes a requested pickup location data point in a particular region, determine the initiated location data points for that set, and determine, from those initiated location data points, which location data point is best suited as the pickup location (e.g., the best-suited location for ease of both the user and the service provider for initiating performance). Based on these determinations, the system can associate the best-suited location(s) with the particular region (or a particular location) and store the information as an entry in a pickup mapping table (e.g., referred to herein as a "pickup entry"). For example, for a region, Region X, at the northwest street corner of Street A and Street B (e.g., corresponding to a building on that street corner), the best-suited location can correspond to a position on Street A next to the curb thirty feet west of the street corner. The pickup entry for Region X can be stored in the pickup mapping table and can associate Region X with the determined best-suited location data point. As an addition or an alternative, the pickup entry for Region X can be associated with multiple best-suited location data points. The system can store multiple pickup entries in the pickup mapping table for different regions.

In some examples, when the system receives a request for transport service, including the requested pickup location data point, the system can access the pickup mapping table from memory to determine if the requested pickup location data point is positioned within a region identified in a pickup entry. If the requested pickup location is positioned within a specified region of a pickup entry, the system can identify the corresponding predetermined location data point (e.g., the best-suited location data point) associated with that region. The system can then transmit the predetermined location data point to the selected driver's device as the pickup location for the driver to get to in order to initiate the transport service, as opposed to the requested pickup location specified by the user in the request for transport service.

Still further, in some examples, the system can also assist a user in selecting the best pickup location for requesting a transport service. A user can operate a designated service application on her mobile device that communicates with the transport arrangement system. When the designated service application is opened or launched, the application can display a map user interface in which the current location of the user's device is shown. A graphic indicator (referred to herein as a "pin") can also be shown on the map user interface representing the location that the user wishes to be picked up at. The user can move the pin to select a different location before making the request for transport service via user input on the designated service application. In some cases, depending on the current location of the user's device, the system can provide a location data points to the user's device to automatically position the pin to a specific location on the map interface on behalf of the user.

In another example, the system can determine a set of trip entries that each includes a requested pickup location data point in a particular region. The system can perform a clustering operation(s) on the requested pickup location data points of the set in order to determine a single location data point for the particular region (e.g., referred to herein as a "clustered location data point" or a "calculated location data point"). The system can store the information about the region and the associated clustered location data point as an entry (e.g., referred to herein as a "clustered entry") in a cluster mapping table. At a later time, when the system determines that a service application has been opened on a user device that is positioned within the particular region, the system can cause the service application to automatically position the pin on the map user interface to a position corresponding to the clustered location data point associated with that particular region.

Still further, using similar operations describe herein, the system can use the mapping table to provide one or more proposed location data points for the user to assist the user in selecting a suitable pickup location for requesting a transport service. For example, the system can determine a plurality of requested pickup location data point in an area and determine a plurality of corresponding initiated location data points where the transport services had started for those requested pickup location data points. The system can determine, from the plurality of initiated location data points, one or more proposed location data points that are suitable locations for initiating the transport service. When the user is in the process of selecting the pickup location, e.g., is moving the pin in the area on the map user interface, the system can provide the one or more proposed location data points to be displayed on the map user interface, which each indicates a suitable location for initiating the transport service. The user can then move the pin to a proposed location data point to designate as the pickup location for the request.

Among other benefits and technical effect, as compared to any conventional approach, examples described herein promote the efficiency of initiating on-demand services, thereby increasing the collective efficiency of the network service.

Some examples recognize that pickup locations specified by users for transport services may not necessarily be a suitable location for actual pick up. A pickup location specifying a building address, for example, does not actually correspond to a location that is feasible for a service provider to actually pick up the user, while a pickup location near a street, in another example, may not have an area where the service provider can actually stop to pick up the user. In other words, some pickup locations specified by users may not be efficient or safe for users and service providers. This can result in a user and a service provider not knowing where each other will be, thereby causing a delay in initiating the transport service (wasting time for both users and service providers) and/or resulting in a negative experience in which the user has to contact the service provider to arrange an actual meeting location (or vice versa). Examples described herein can perform data computations on an immense collection of data to intelligently establish location associations that can be used to enable individual users and service providers to quickly rendezvous together with little or no user interaction.

Additionally, some examples further recognize that the interests of the individual driver and/or passenger may not be aligned with the interest of a service which arranges the transport services. For example, a transport arrangement service may select drivers for riders based on optimization criteria which serves a collective (e.g., total passenger wait time), while the interest of the driver may be to acquire the next ride that is nearby. In this regard, the process of communicating a better pickup location can be determined without influence from the driver or rider, each of whom may have alternative self-interests or ability to determine the better pickup location. For example, if the position of the rider at a current instance was known to the driver and the driver has the ability to suggest the pickup location, the driver may have motivation to choose a spot which may have additional risk to reach (e.g., rider needs to cross busy street). Likewise, if the rider could demand the pickup location in each instance, the driver may be forced into a busy street or one which was zoned against stoppage. In both rider and driver approach, the rider and driver may lack instant knowledge of the location and/or environment (e.g., traffic condition), and neither would be able to take into account an optimization for the collective (e.g., all riders in a square mile who are needing pickup). Accordingly, examples as described provide for a service which (i) selects a pickup location (after receiving a pickup request) in a manner that balances the interests of the rider, driver and/or other riders/drivers, using real-time information from a population of drivers and riders, and (ii) further makes the selection without interference or influence of driver/rider (other than rider's initial request).

As used herein, a client device, a driver device, a computing device, and/or a mobile device refer to devices corresponding to desktop computers, cellular devices or smartphones, personal digital assistants (PDAs), laptop computers, tablet devices, etc., that can provide network connectivity and processing resources for communicating with the system over one or more networks. Client devices and driver devices can each operate a designated service application (e.g., a client application and a driver application, respectively) that is configured to communicate with the transport service arrangement system. A driver device can also correspond to a computing device that is installed in or incorporated with a vehicle, such as part of the vehicle's on-board computing system.

Still further, while some examples described herein relate to transport services, the system can enable other on-demand location-based services (for example, a food truck service, a delivery service, an entertainment service) to be arranged between users and service providers. For example, a user can request an on-demand service, such as a delivery service (e.g., food delivery service, messenger service, food truck service, or product shipping service) or an entertainment service (e.g., mariachi band, string quartet) using his or her mobile device, and the system can select a service provider, such as a driver, food provider, band, etc., to provide the on-demand service for the user.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to arrange an on-demand service for a user and a service provider, under an embodiment. As described herein, the system can process location data associated with previously requested and/or completed on-demand services in order to determine informative location information for use with arranging on-demand services. The system can provide location information to user devices and/or services provider devices when users operate their respective designated service applications, when requests for on-demand services are made, and/or after service providers are selected.

In the example of FIG. 1, the system 100 includes a dispatch 110, a client device interface 120, a driver device interface 130, a location cluster 140, a location match 142, a location map 160, and a plurality of databases. A plurality of client devices 180 and a plurality of driver devices 190 can communicate with the system 100 over one or more networks using, for example, respective designated service applications 181, 191 that are configured to communicate with the system 100 via the client device interface 120 and the driver device interface 130, respectively. The components of the system 100 can combine to process location data and to arrange a transport service for a requesting user using location data. Logic can be implemented with various applications (e.g., software) and/or with hardware of a computer system that implements the system 100.

Depending on implementation, one or more components of the system 100 can be implemented on network side resources, such as on one or more servers. The system 100 can also be implemented through other computer systems in alternative architectures (e.g., peer-to-peer networks, etc.). As an addition or an alternative, some or all of the components of the system 100 can be implemented on client devices, such as through applications that operate on the client devices 180 and/or the driver devices 190. For example, a client service application 181 and/or a driver service application 191 can execute to perform one or more of the processes described by the various components of the system 100. The system 100 can communicate over a network, via a network interface (e.g., wirelessly or using a wireline), to communicate with the one or more client devices 180 and the one or more driver devices 190.

The system 100 can communicate, over one or more networks, with client devices 180 and driver devices 190 using a client device interface 120 and a device interface 130, respectively. The device interfaces 120, 130 can each manage communications between the system 100 and the respective computing devices 180, 190. The client devices 180 and the driver devices 190 can individually operate client service applications 181 and driver service applications 191, respectively, that can interface with the device interfaces 120, 130 to communicate with the system 100. According to some examples, these applications can include or use an application programming interface (API), such as an externally facing API, to communicate data with the device interfaces 120, 130. The externally facing API can provide access to the system 100 via secure access channels over the network through any number of methods, such as web-based forms, programmatic access via restful APIs, Simple Object Access Protocol (SOAP), remote procedure call (RPC), scripting access, etc.

According to examples, the system 100 can provide information about the network service to both client applications 181 and driver applications 191, including the state of the network service. The system 100 can arrange for a transport service to be provided for a user by receiving a request for the transport service from a client device 180

(through use of the client service application 181) and by selecting a driver to perform the transport service for that user. The user may have specified by a pickup location data point by moving and positioning a graphic indicator (e.g., a pin) on the map user interface of the client service application 181 or by inputting an address, street intersection, or landmark in a text submission feature. Alternatively, a pickup location data point can correspond to the current location of the client device 180, as determined by the client device 180 using one or more geo-aware resources of the client device 180, such as a global positioning system (GPS) receiver. For example, the dispatch 110 can receive the request, access the client database 112 to determine user information, access the driver database 114 to determine which drivers are available to provide the transport service, and select a driver based on one or more specified parameters via the driver select component of the dispatch 110.

Once the transport service is arranged for the user, the system 100 can monitor the status or progress of driver and/or the transport service (e.g., by communicating with a driver device 190 of the selected driver through use of the driver service application 191) and can determine a variety of information for that particular transport service. For example, during the transport service, the driver application 191 can periodically transmit location information of the driver device 190 (using the GPS receiver of the driver device 190) and/or transmit state information of the driver application 191 to the system 100. During and/or after completion of the transport service, information about the transport service can be stored as a trip entry 151 in a trips database 150. Depending on implementation, the system 100 can store trip entries 151 in a single trips database 150 or in multiple trips databases 150 for different geographic areas (e.g., a neighborhood, a city, a metropolitan area, a county, a state, a country, etc.).

A trip entry 151 can include a variety of information about a particular transport service. For example, for an individual transport service (or trip), the trip monitor component of the dispatch 110 can receive information (e.g., periodically and/or intermittently, in response to user input) from a driver device 190 of the selected driver once the trip is arranged. In one example, the trip monitor component can receive information from the driver device 190 about the time and/or its location when the driver provides input (using the driver service application 191) to accept an invitation to perform the transport service. Similarly, the trip monitor can receive information from the driver device 190 about the time and/or its location when the driver provides input to initiate the transport service (e.g., the requested user has been picked up by the driver). The trip monitor can continue to monitor the progress of the transport service by receiving time and/or location information from the driver device 190 via the driver service application 191, including when the transport service has been completed at the destination (where the user is dropped off).

As such, in some examples, a trip entry 151 can include a trip identifier (ID), a user ID of the user that requested the transport service, a driver ID of the driver that provided the transport service, a requested pickup location data point (specified by the user in the request for the transport service), an initiated location data point where the transport service begun (e.g., the location of the driver device 190 when the driver provides input indicating that the transport service has begun), a destination location data point where the transport service was completed (e.g., the location of the driver device 190 when the driver provides input indicating that the transport service has been completed), and other information, such as the vehicle type, the price, the duration of the trip, the route taken, etc.

In addition, in one example, a trip entry 151 can also include information whether the initiated location data point for the trip was a suitable or correct pickup location or an inadequate or poor pickup location for the user. For example, a suitable or correct pickup location can be a location that is (i) close enough for the user to quickly or easily get to (e.g., just around the corner or just outside the front door of the building the user is in), (ii) close to the requested pickup location data point requested of the user (e.g., within a short predetermined distance of the user), and/or (iii) near a street that enables the driver to move in the direction that the user wishes to travel in once the user is picked up at the location (e.g., without the driver having to perform a U-turn after picking up the user). Similarly, an inadequate or poor pickup location can be a location that is too far/too difficult for the user to get to, far from the requested pickup location data point requested by the user, and/or near a street that causes the driver to have to travel in inefficient or opposite directions once the user is picked up at the location (e.g., the driver has to make multiple right turns to get to a street going in the correct direction).

Depending on implementation, for individual trips, the system 100 can determine whether an initiated location data point is suitable or inadequate based on one or more of a distance between the requested pickup location data point and the initiated location data point, positive or negative feedback provided by the user (e.g., a rating provided by the user, comments provided by the user, etc.), the route traveled by the driver to the user's destination during performance of the transport service (e.g., whether the route was efficient or not as a result of the initiated location data point), or survey information 153. In one example, a large number (e.g., more than a threshold number) of initiated pickup location data points that are within a small distance of each other (e.g., within a predetermined distance) can indicate that those initiated location data points are suitable location data points for pickup. In another example, after a user is picked up by a driver for a transport service, the user can be prompted via the client service application 181 to respond to a survey question of whether the pickup was at a suitable or correct pickup location (e.g., the user can simply provide an input of "yes" or "no"). Such survey information 153 can be associated with the trip entry 151 to identify whether the associated initiated location data point was suitable or not. As an addition or an alternative, the survey information 153 can be used to mark a positive or negative indication for the initiated location data point on the trip entry 151.

Using the location information from the stored trip entries 151, the system 100 can determine which locations are most suitable or convenient for the performance of transport services in given regions and can provide location information to users and/or drivers when appropriate. According to an example, the location cluster 140 can access the trips database 150 to perform one or more clustering processes on requested pickup location data points. Similarly, the location cluster 140 can perform one or more clustering processes on initiated location data points. As described herein, a clustering process corresponds to a process or analysis that is used (e.g., once, multiple times, iteratively, etc.) to group sets of location data points together so that location data points in the same group are more similar to each other than to those in other groups (e.g., based on distance between location data points).

In addition, in some examples, the location cluster 140 can also use map data 171 from a map database 170 to identify streets, determine landmarks or points of interest, and/or determine individual regions. For example, using map data 171, the location cluster 140 can determine that a group of requested pickup location data points can be associated with or correspond to a particular region. Such a region can be a landmark, a particular building or portions of a building, a street corner region or portions of a street, a park, a city block, multiple city blocks, a section of a street, a neighborhood, multiple neighborhoods, a city, a county, etc. In examples described herein, a region can also be defined using three or more location data points that make up the perimeter or boundary of that region.

Depending on implementation, the system 100 can determine and use clustered location data points for assisting the users and/or the drivers with identifying suitable locations for initiating transport services in different ways. Using one or more clustering processes (and/or map data 171), the location cluster 140 can (i) determine groups of requested pickup location data points (where each group can be associated with a unique identifier or be associated with or correspond to a particular region, in some examples), and (ii) determine a clustered (or calculated) pickup location data point for each group or region. Similarly, the location cluster 140 can use one or more clustering processes to determine groups of initiated pickup location data points and determine a clustered initiated location data point for each group. Still further, in other examples, the location cluster 140 can also use one or more clustering processes to determine groups of destination location data points and determine a clustered destination location data point for each group In one example, for a group or corresponding region, the clustered location data point can correspond to a location data point in which the sum of the distances from all location data points in that group is minimized. As such, a clustered location data point can be a substantially central or averaged location data point of a group of location points or a region. An example of a clustering operation is k-means clustering. The location cluster 140 can store the clustered location data point with the associated region as a cluster entry 147 in a cluster mapping database 145.

For example, the cluster mapping database 145 can store one or more tables with a plurality of cluster entries 147. A cluster entry 147 can include (i) a corresponding identifier (ID) of the cluster entry 147, (ii) a clustered location data point (and/or an associated ID of the clustered location data point), (iii) an ID of the associated region or an ID of the group of location data points, and/or (iv) geographic data about the associated region, such as a set of three or more location points that make up the associated region, or geographic data to define the group of location data points. While a single cluster mapping database 145 is illustrated in FIG. 1, depending on variations, the system 100 can store cluster entries 147 in a plurality of mapping tables in the cluster mapping database 145 or in multiple cluster mapping databases 145 for different location points, for different geographic areas and/or for different users or groups of users.

Depending on implementation, the location cluster 140 can also determine cluster entries 147 for individual users, for groups of users, and/or for all users of the system 100. As discussed, each trip entry 151 in the trips database 150 can be associated with a user ID. The location cluster 140 can communicate with the client database 112, determine the requested pickup location data points for an individual user from the trip entries 151 for that user, perform one or more clustering processes in order to determine groups of requested pickup location data points for that user, where each group is associated with a region, and determine a clustered location data point for each group/region.

As an example, a user, User 1, may have previously requested and received five hundred trips in the San Francisco Bay Area, with two hundred previous trips having been made during a particular time of day (e.g., evening) and in a particular region (e.g., at a street corner near User 1's office in San Francisco), one hundred previous trips having been made during another particular time of day (e.g., morning) and in another region (e.g., on a street next to the train station in San Francisco), etc. As a result of performing the clustering operation(s), for User 1, the location cluster 140 can determine different groups of requested pickup location data points—a first group of requested pickup location data points can correspond to a first region near User 1's office, a second group of requested pickup location data points can correspond to a second region near the train station, etc. The location cluster 140 can also determine a clustered location data point for each group/region using the clustering operation(s) and/or other operations.

For User 1, the location cluster 140 can then generate and store (i) a cluster entry 147 for the first group in the cluster mapping database 145, in which the corresponding first group or region is associated the first clustered location data point, (ii) a cluster entry 147 for the second group in the cluster mapping database 145, in which the corresponding second group or region is associated with the second clustered location data point, and so forth for other groups or regions and associated clustered location data points. As an addition or an alternative, in similar fashion, the location cluster 140 can determine groups/regions and their associated cluster location data points based on the requested pickup location data points for other individual users, for more than one user (e.g., groups of users), and/or for all users of the system 100. In addition, in some examples, the location cluster 140 can use the requested pickup location data points for only the last predefined set of trips (e.g., the most recent three hundred trips, two thousand trips, etc.) in order to determine the cluster entries 147 for a user, multiple users, and/or all users. Still further, in other examples, the location cluster 140 can also generate and store cluster entries 147 based on different times of day.

According to examples, the system 100 can use the cluster entries 147 to provide users with a suitable/beneficial initial location for requesting transport services. In examples described herein, a clustered pickup location data point can correspond to a location that represents a region or a group of location data points where a user and/or other users have previously requested transport services (e.g., a representative location data point for a group of location data points). As such, in one example, if a user is currently located in or is close to a region where that user (and/or a collection of other users) had made previous transport requests, the system 100 can enable an appropriate pickup location data point to be initially set for that user even before the user has to manually select or input the pickup location data point. For example, when the user operates the client service application 181, the pin can be automatically placed at a particular location data point (that is different from the user's current location) on the map user interface. The user can then change the pickup location or move the pin from that initial location if preferred.

The system 100 leverages the notion that, typically, a user may mark or pin, on the map interface of the client service application 181, a pickup location data point at a place that is close to a street or is accessible by a vehicle. In one example, when a user makes a request from her desk inside her office building (which can be very large), the user may move the pin to a specific street corner or a turnaround loop in front of the building entrance (as opposed making a request with the pickup location data point being specified as the user's current location at her desk). The user may continue to request an identical or similar location data point numerous times if that location was a suitable pickup location for transport service. Using this location information, the location cluster 140 can perform a clustering operation(s) to determine a clustered location data point for this region or group of pickup location data points, which can represent a suitable pickup location data point based on the user's previous requested pickup location data points.

Once cluster entries 145 are stored in the cluster mapping database 145, the system 100 can use the stored location and group/region information, if available and/or applicable, to provide clustered location data points to client devices 180. For example, a user that wants to request a transport service can open or launch a service application 181 on her client device 180. When the user opens the service application 181 on her client device 180 (or wakes up/activates the service application 181 from an inactive or sleep mode to an active mode), the service application 181 can exchange data with system 120 via the client device interface 120. In one example, the location match 142 can receive status information 185 from the client device 180 via the client device interface 120. The status information 185 can include, for example, the user's ID (and/or device ID) as well as the current location of the user's client device 180. The location match 142 can access the appropriate cluster mapping database 145 to determine whether the current location of the client device 180 is within a region that is specified in a cluster entry 147 (and/or within a predefined distance from a region that is specified in a cluster entry 147) when the service application 181 is opened or activated. In other words, the location match 142 can determine whether the user is in or is close to a region that has an associated clustered location data point. Alternatively, the location match 142 can determine whether the user's location corresponds to a location in the group of clustered locations (as opposed to a region), and can determine the associated clustered location data point. In such examples, the cluster mapping database 145 can associate individual location data points in the group with the associated clustered location data point.

If the client device 180 is determined to be located within a region that is specified in a cluster entry 147 or within a predefined distance from a region that is specified in a cluster entry 147 (or alternatively, if the location of the client device 180 corresponds to a location in the group of clustered locations), the location match 142 can identify the cluster entry 147 and determine a corresponding clustered location data point that is associated with that region. The location match 142 then can provide the clustered location data point 187 to the client device 180 to cause the service application 181 to automatically position a graphic indicator (e.g., a pin) to a location on the map interface corresponding to the clustered location data point 187 on behalf of the user. The user can then select an input to make a request for the transport service without first having to separately specify a pickup location data point. The request can include the clustered location data point as the requested pickup location data point, e.g., as opposed to the current location of the user being the requested pickup location data point.

As an addition or an alternative, the location match 142 can access the cluster mapping database 145 to determine whether the current location of the client device 180 is within or close to a specified region based on a predefined or user-configured hierarchy. For example, the location match 142 can first search or query the cluster entries 147 corresponding to the particular user (using the user's ID and/or device ID) before searching or querying the cluster entries 147 of groups of users and/or all users of the system 100. If the location match 142 determines that the client device 180 is not within or close to a region that is specified in a set of cluster entries 147 corresponding to that user, the location match 142 can then determine whether the client device 180 is within or is close to a region that is specified in another set of cluster entries 147 corresponding to both the user and other users (e.g., as other users' transport service pickup location data points can be helpful for identifying a commonly used or suitable/beneficial pickup location).

If the client device 180 is determined to not be located in or close to a region that is specified in a cluster entry 147, the location match 142 will not provide any clustered location data point to the client device 180. For example, a cluster entry 147 for the region may not have yet been generated or stored by the system 100 if there are an insufficient number of transport requests that have been made in the region by the user and/or other users (e.g., a predetermined threshold number). As such, the service application 181 operating on the user's client device 180 can display, on the map interface, the pin at a default location (e.g., the current location of the user) as opposed to a clustered location data point.

In this manner, the system 100 can guide the pin on the map interface to a convenient and suitable location for the user to make a transport request without having the user manually or separately specify a pickup location data point when operating the service application 181. The clustered location data point can be representative of a location that the user should request pickup for a transport service based on the user's (and/or other users') prior history of specifying requested pickup location data points in the region.

In another example, the location cluster 140 can determine a clustered initiated location data point for a group of initiated location data points and provide information about the clustered initiated location data point(s) to the client device 180. Examples described herein recognize that the actual location where a transport service initiated does not necessarily correspond to the pickup location specified by the user in the transport request. For example, a given city block can include one or more large buildings (office building, apartment complex, etc.), in which users leaving those buildings have requested and received transport services. The city block, such as one that is bounded by Market Street to the north, Mission Street to the south, 11th Street to the west, and 10th Street to the east, can be located in a city, such as San Francisco, where certain areas of the streets surrounding the city block may not be suitable for initiating transport services. As a result, transport services may have initiated in certain locations on streets surrounding the city block. For a collection of trip entries 151 in which the respective transport services had initiated within a predetermined distance of the city block, for example, the location cluster 140 can determine that there are six best-suited pickup location data points on the surrounding streets based on the groupings of the initiated location data points. For example, the location cluster 140 can have determined a first best-suited pickup location data point from a first group of initiated location data points on 10th Street near the corner of 10th Street and Market Street, a second best-suited pickup location data point from a second group of initiated location data points on 11th Street near the corner of 11th Street and Market Street, and so forth. As a result, if a user that is near the city block or is considering getting picked up near the city block, the system 100 can propose one or more best-suited location data points (e.g., each corresponding to a clustered initiated location data point) to the user.

In such an example, the system 100 can determine when the user is providing user input to reposition or move the pin on the map user interface of the client application 181. The location match 142 can receive information about the user input and the location corresponding to the position of the pin on the map user interface (e.g., "the pin location") via the client device interface 120. Based on the pin location, the location match 142 can determine the one or more clustered initiated location data points that are within a predetermined distance of that location by identifying cluster entries 147 in the cluster mapping database 145. The one or more clustered initiated location data points can represent a location(s) that is suitable for initiating transport services in an area near the location (e.g., suggested pickup locations). The location match 142 can provide the one or more clustered initiated location data points to the client application 181, so that the client application 181 can display one or more corresponding graphic indicators on the map user interface. As an addition or an alternative, in some examples, the suggested location data points can correspond to clustered pickup location data points, as opposed to clustered initiated location data points, determined by the location cluster 140 and stored in the cluster mapping database 145.

As the user continues to move the pin location, the location match 142 can continue to provide updated one or more clustered initiated location data points to the client application 181 so that the client application 181 can dynamically display the graphic indicators corresponding to the one or more clustered initiated location points. The user can place the pin on one of the graphic indicators to set as a pickup location for a request for the transport service. In some examples, when the pin is moved close to a graphic indicator on the map user interface, the graphic indicator can dynamically expand in size from a default size (e.g., a circle with a predetermined radius or size) to a larger size to provide a visual feedback for the user, and if the user places the pin on the expanded graphic indicator (e.g., stops providing user input to move the pin), the pin can jump to or snap to the center of the graphic indicator. The graphic indicator can be reduced in size to the default size and/or removed from display on the map user interface once the pin is placed on the graphic indicator.

According to some examples, the system 100 can also use location information from trip entries 151 to guide or assist users and/or drivers to travel to particular locations for enhancing the ease of pickups for providing transport services. In one example, the location mapping 160 can access the trips database 150 to determine, for a given region, a set of trip entries 151 each having a requested pickup location data point in the given region. Depending on implementation, the location mapping 160 can use map data 171 from the map database 170 to identify location points, identify streets, and/or determine landmarks or points of interest, etc., in order to determine individual regions. As an addition or an alternative, the location mapping 160 can also use information about determined clustered location data points for the associated groups of clustered location data points or regions 161 previously determined by the location clustering 140 and stored in the cluster mapping database 145.

For each of the set of trip entries 151 in a given region, the location mapping 160 can determine the initiated location data point (representing the driver's location when the transport service was initiated or where the user got into the vehicle). Typically, when a user makes a transport request and provides a pickup location data point, the selected driver may not actually be pick up the user at the exact pickup location data point. Instead, the driver may pull over or park at a location that is proximate to the requested pickup location data point, accessible by the vehicle, accessible by the user, etc. Accordingly, for the set of trip entries 151 in the given region, a plurality of initiated location data points can exist that are different from the requested pickup location data point. Based on the previous initiated location data points for a given region, the location mapping 160 can determine a suitable or best-suited location data point for the given region.

For example, the location mapping 160 can determine, from the cluster mapping database 145, the clustered initiated location data points. In another example, the location mapping 160 can determine the clustered initiated location data points from the cluster mapping database 145 that correspond to groups of initiated location data points that users had indicated as being a suitable or accurate pickup location (e.g., a sub-set of the set of trip entries 151 may have those initiated location data points previously indicated by users as being suitable or accurate pickup locations based on survey information 153). As an addition or an alternative, the location mapping 160 can process the clustered initiated location data points (or a sub-set of the clustered initiated location data points) based on map data 171 so that the clustered initiated location data point can be fitted to a street, road, highway, turnaround, driveway, etc. Still further, a user of the system 100 can also provide input to configure, adjust, or select the clustered location data point for a given region (e.g., as part of an auditing process). Such a clustered initiated location data point can be representative of the best-suited pickup location data point.

The location mapping 160 can associate the best-suited pickup location data point with a given region or with a set of location data points and store the information as a pickup entry 167 in the pickup mapping database 165 (e.g., discussed below with FIGS. 4A through 4C). For example, a set of pickup location data points made on a certain street segment can be associated with a set of initiated location data points, and the clustered initiated location data point can correspond to the best-suited pickup location data point for the set of pickup location data points. Alternatively, the location mapping 160 can associate the best-suited pickup location data point with individual location data points as pickup entries 167 in the pickup mapping database 165.

According to some examples, the location mapping 160 can also associate text and/or an image(s) with each best-suited pickup location data point in a corresponding pickup entry 167. Text and/or image(s) can be associated with a best-suited pickup location data point based on map data 171 and/or other input from users of the system 100. Such text and/or image(s) (e.g., referred to herein as "associated information") can correspond to the best-suited pickup location data point and provide information about that location data point. As an example, the associated information can provide text that informs a driver to go to a particular location, such as, "pull up to the loading zone," "go to Door 2 at Terminal 1," "the pickup location is on your right just in front of the bank," etc. In this manner, the system 100 can use the information in the pickup mapping database 165 to assist or guide the driver for purposes of transport services and/or to provide supplemental information to improve user pickups.

As an example, a user can make a transport request 183 by operating the client service application 181 on her client device 180. The transport request 183 can include a pickup location data point 184 specified by the user. Such a pickup location data point 184 can correspond to a clustered location data point previously provided by the system 100 or one that is manually selected or inputted by the user (e.g., by moving the pin to a location and/or moving the pin to a suggested location data point). The dispatch 110 can receive the transport request 183, and perform a driver selection process based on current conditions, including the pickup location data point 184. The driver select component can access the driver database 114 to determine a pool of drivers to select a driver from based on one or more parameters (e.g., proximity or estimated travel times to the pickup location data point 184 and/or direction of travel of the drivers, etc.). Depending on implementation, the dispatch 110 can access the pickup mapping database 165 to determine whether the pickup location data point 184 is mapped to another predetermined location or is within a region specified in a pickup entry 167. The dispatch 110 can make this determination in response to receiving the transport request 183, and before, during, or after selecting the driver for the user.

If the pickup location data point 184 is determined to not be located in a region that is specified in a pickup entry 167 or is determined to not have a corresponding best-suited pickup location, the dispatch 110 can send a transport service invitation 193 to the selected driver's device 190, including the pickup location data point 184 specified by the user. For example, a pickup entry 167 for the pickup location data point 184 or the region may not have yet been generated or stored by the location mapping 160 if there are an insufficient number of transport requests that have been made in the region by the user and/or other users (e.g., a predetermined threshold number). The driver service application 191 can display a user interface that includes location information based on the pickup location data point 184 and an invitation feature to enable the driver to either accept or reject the invitation 193. If the driver accepts the invitation 193, the driver service application 191 can transmit an acceptance 195 and can display (through interaction with or use of other applications and/or services) a route and/or directions to the pickup location data point 184.

On the other hand, if the pickup location data point 184 is determined to be located in a region that is specified in a pickup entry 167 or is determined to have a corresponding best-suited pickup location, the dispatch 110 can determine a predetermined location data point 194 of that pickup entry 167. In other words, the dispatch 110 can determine that the pickup location data point 184 has an associated predetermined location data point 194 (as a result of it being in the given region). The dispatch 110 can transmit a transport invitation 193 to the selected driver's device 190 that includes the predetermined location data point 194 corresponding to that region. As described herein, the predetermined location data point 194 can correspond to a best-suited location data point for a given region or for a specific location data point that was previously determined by the location mapping 160 and subsequently stored as a pickup entry 167 in the pickup mapping database 165. The driver service application 191 can receive the predetermined location data point 194 as opposed to the actual pickup location data point 184 specified by the user. If the driver accepts the invitation 193 that includes the predetermined location data point 194, the driver service application 191 can transmit an acceptance 195 and can display (through interaction with or use of other applications and/or services) a route and/or directions to the predetermined location data point 194 as opposed to the pickup location data point 184.

In many situations, providing the predetermined location data point 194 that represents the best pickup location can be more beneficial than providing the requested pickup location data point 184. For example, the user may have made the transport request 183 from his current location, which could be inside a building, such as a house. Such a pickup location data point may provide an address to the driver, but may not inform the driver where to actually pull up to the curb or park. Similarly, if the driver sees a corresponding pin of such a pickup location data point on the map interface of the service application 191, the driver may not know exactly where to travel to. Accordingly, by determining the best-suited location data point based on historical location information (e.g., from stored trip entries) and providing that best-suited location data point to the river, the driver can provide more accurate and efficient pickups for transport services.

Still further, in some examples, from the corresponding pickup entry 167, the dispatch 110 can also determine associated information, if any, that corresponds to the predetermined location data point 194. According to an example, associated information can be stored in the respective pickup entry 167 corresponding to the given region. The associated information can provide textual and/or graphic information that guides the driver to a particular location that is associated with the predetermined location data point 194. By providing such associated information to the driver device 190, the service application 191 can display supplemental information, such as text, to inform the driver to travel to the best-suited location.

As an addition or an alternative, if the user's pickup location data point 184 is in a given region of a pickup entry 167, the dispatch 110 can provide both the pickup location data point 184 and the predetermined location data point 194 to the driver device 190 (and associated information, such as text). The driver service application 191 can receive both location data points and use each location data point for different purposes. According to an example, when the invitation 193 is received, the service application 191 can use the pickup location data point 184, perform a reverse geocoding process to identify a corresponding address for the pickup location data point 184, and display a user interface showing the user's location (e.g., on a map) along with the address. If the driver accepts the invitation 193, the service application 191 can then use the predetermined location data point 194 to provide the driver with a more detailed, more accurate, and best-suited pick up location. In another example, as the driver approaches the pickup location data point 184 (e.g., is within a predefined distance from the pickup location), the service application 191 can then display the supplemental textual information based on the predetermined location data point 194. As such, the driver can be generally familiarized with where to travel to get to the user, but also be provided with an exact location to pick up the user.

The system 100 can continue to update the databases as transport services are continuously arranged by the dispatch 110. In some examples, as the system 100 continuously updates the trips database 150 with trip entries 151, the location clustering 140 and the location mapping 160 can also continue to update the cluster mapping database 145 and the pickup mapping database 165. Depending on variations, the components of the system 100 can update the respective databases periodically or intermittently based on input from a user of the system 100. In another example, the components of the system 100 can update the respective databases each time one or a set of trip entries 151 are added to the trips database 150.

Still further, a user of the system 100 can control when the system 100 updates the cluster mapping database 145 and the pickup mapping database 165, e.g., as a whole or depending on different regions. For example, based on user configuration, the location cluster 140 can update the cluster mapping database 145 periodically (e.g., at a first frequency), and the location mapping 160 can update the pickup mapping database 165 periodically (e.g., at a first frequency or a different frequency).

In addition, while the location mapping 160 and the location clustering 140 are illustrated as different components in the example of FIG. 1, in other examples, the location mapping 160 and the location clustering 140 can be combined as one component or the location clustering 140 can perform the functionality of both. Similarly, other components of FIG. 1 can be included with or be a part of another component.

Methodology

FIG. 2A illustrates an example method for determining a location data point for an on-demand service, according to an embodiment. A method such as described by an embodiment of FIG. 2A can be implemented using, for example, components described with an embodiment of FIG. 1. Accordingly, references made to elements of FIG. 1 are for purposes of illustrating a suitable element or component for performing a step or sub-step being described.

A system 100 can arrange transport services to be provided by drivers for requesting users through use of computing devices. The system 100 can store a trip entry for each transport service that has been requested by a user and/or completed in a data store. In some variations, the system 100 can arrange other on-demand services, such as a delivery service, a food service, an entertainment service, etc., to be performed. Referring to FIG. 2A, the system 100 can store a plurality of on-demand service entries (e.g., trip entries) in a memory resource, including storing a set of on-demand service entries that corresponds to a particular region (210). Each on-demand service entry of the set can include a requested location data point (e.g., a requested pickup location data point). The system 100 can continue to generate and store on-demand service entries each time a request for an on-demand service is made and/or completed.

In some examples, the system 100 can perform one or more clustering processes, such as k-means clustering, in order to group on-demand service entries together based on requested location data points and/or to determine regions for the groups. For example, the system 100 can determine hundreds of groups of location data points or regions including location data points within a geographic area, such as an area defined for San Francisco, Calif. In this geographic area, a given region can correspond to a group of requested location data points. The system 100 can determine a clustered location data point for the group of location data points or for the given region based, at least in part, on the requested location data points of the set (220). According to one example, the system 100 can perform one or more clustering processes, such as k-means clustering, to determine a clustered location data point for the given region. Such a clustered location data point can be a substantially central or averaged location data point for the group of requested location data points in the given region. Still further, depending on implementation, the system 100 can determine a clustered location data point for a given region for a particular user. For example, for an individual user, the system 100 can determine on-demand service entries for that user and determine requested location data points for a given region.

For each region, the system 100 can then store the clustered location data point with the associated region in a cluster mapping table (230). For example, the system 100 can generate a cluster entry for each group of location data points or for each region that identifies that group or region (e.g., with a region ID and/or three or more location data points that define the region), the associated clustered location data point, and/or a user ID, if the cluster entry is for a particular user. The system 100 can access the cluster mapping table at a later time for purposes of assisting a user in making an on-demand service request.

As an addition or an alternative, the method described in FIG. 2A can also be performed with respect to other location data points stored in the set of trip entries. For example, rather than determining a clustered location data point based on a set of requested location data points, the system 100 can determine a clustered location data point based on a set of initiated location data points. Alternatively, the system 100 can determine a clustered location data point based on a set of destination location data points.

Figure 2B:
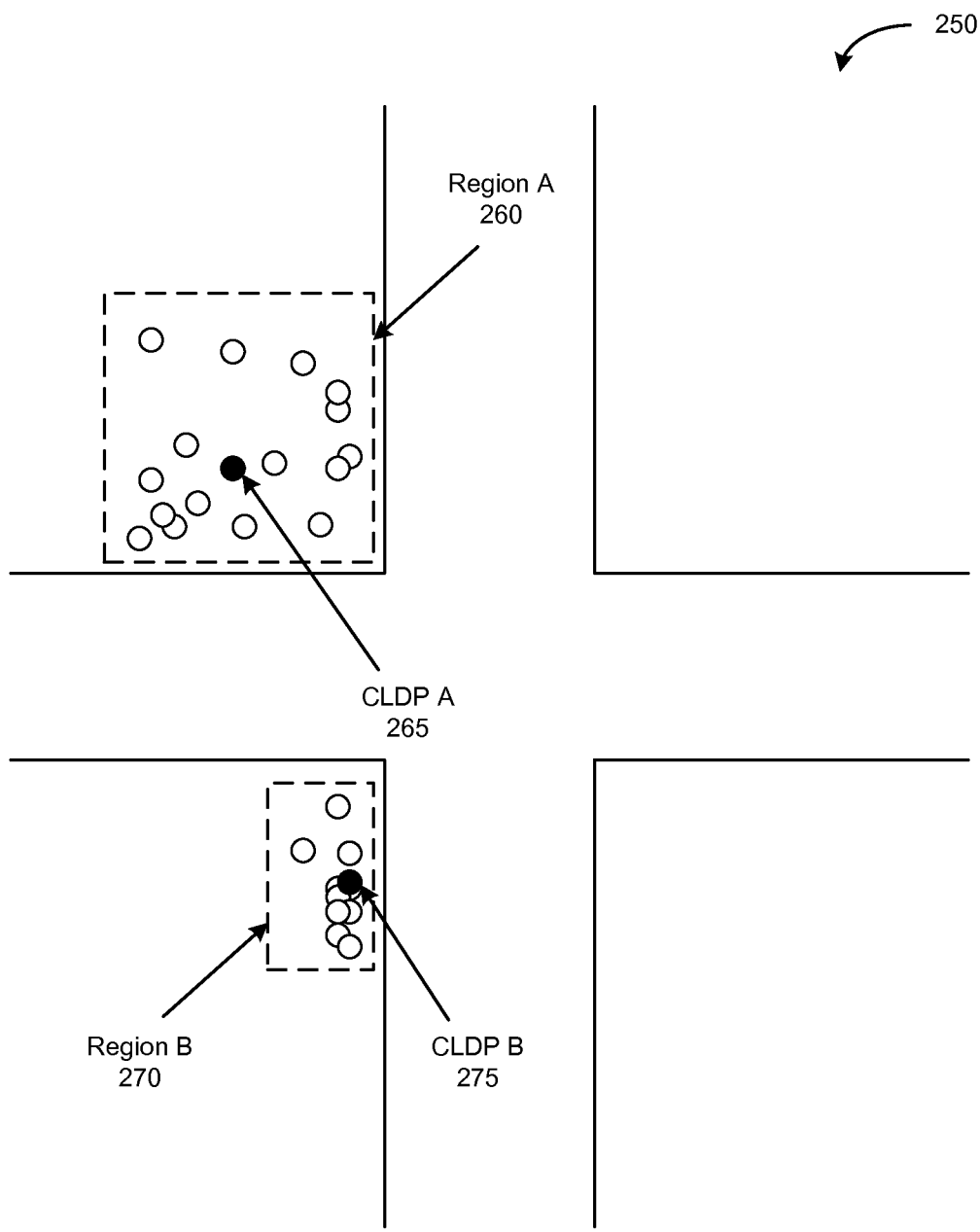
FIGS. 2B and 2C illustrate example diagrams depicting regions and clustered location data points.

FIG. 2B illustrates an example diagram depicting regions and clustered location data points. The diagram 250 illustrates an area corresponding to an intersection of two streets. Based on performing one or more clustering processes on requested location data points, the system 100 may have determined two groups of requested pickup location data points corresponding to two regions, Region A 260 and Region B 270. While the area may include additional regions, for purposes of simplicity, only two regions are illustrated in the diagram 250.

As illustrated in FIG. 2B, Region A 260 corresponds to a region encompassing a first group of requested location data points and Region B 270 corresponds to a region encompassing a second group of requested location data points (each requested location data point being indicated by a white circle). Each requested location data point can correspond to a location data point specified in an on-demand service request by a user operating a client device. In addition, by performing one or more clustering processes, the system 100 can also determine a clustered location data point (CLDP) for each region.

For example, the system 100 may have determined CLDP A 265 for Region A 260 and CLDP B 275 for Region B 270. The system 100 can then generate and store, in a memory resource, a first cluster entry for Region A 260 with the associated CLDP A 265 (e.g., as a latitude and a longitude coordinate) and a second cluster entry for Region B 270 with the associated CLDP B 275 (e.g., as a latitude and a longitude coordinate). The system 100 can modify the cluster entries (e.g., modify the respective regions and/or the respective CLDPs) as additional on-demand service requests having requested location data points within the regions are made by users.

Figure 2C:
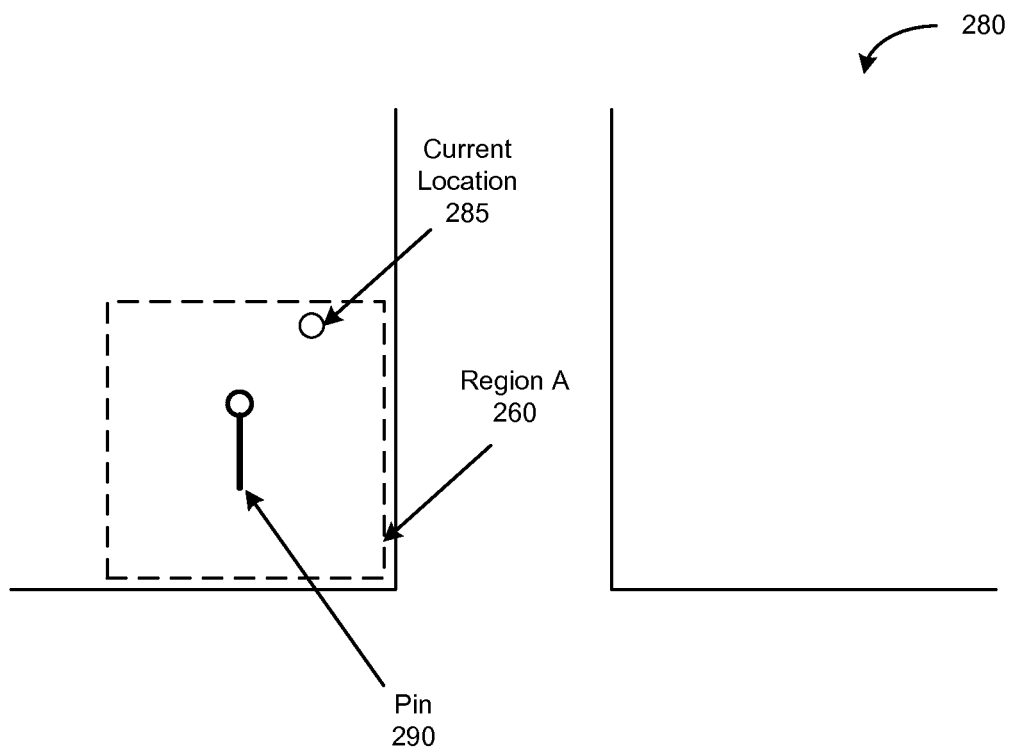

FIG. 2C illustrates an example diagram depicting a portion of a user interface provided by a client service application running on the client device. According to an example, a user may have opened the client service application on her client device, such as after a period of inactivity, after the client service application was activated from a sleep or inactive mode on the device, etc. In response, the service application can automatically determine the current location of the client device (e.g., the user's current location) and transmit, over one or more networks (e.g., a cellular network), the current location data point to the system 100.

In this example, the system 100 had determined that the user's current location data point is within a specified region (e.g., Region A 260) of a cluster entry (such as previously determined as illustrated in FIG. 2B) by accessing the clustering mapping table using the received current location data point. In response, the system 100 had determined the CLDP A 265 of that region, and had transmitted the CLDP A 265 to the client device.

The diagram 280 illustrates a portion of the user interface of the service application, such as a portion of the map user interface, as a result of receiving the CLDP A 265 as a suitable pickup request location data point for the user. For example, after receiving the CLDP A 265 from the system 100, the service application can automatically move or show the pin 290 at the corresponding CLDP A 265 on the user interface. Accordingly, the diagram 280 can provide a graphic indicator showing the user's current location 285 as well as the pin 290 at a different location. The user can then just select a feature to request the on-demand service without having to first manually move the pin 290 to a location on the map user interface. The automatic placement of the pin 290 to the CLDP A 265 can be extremely helpful in some situations, such as when the client device has a large GPS error so that the user's current location 285 appears to be further away from where the user actually is located.

Figure 3:
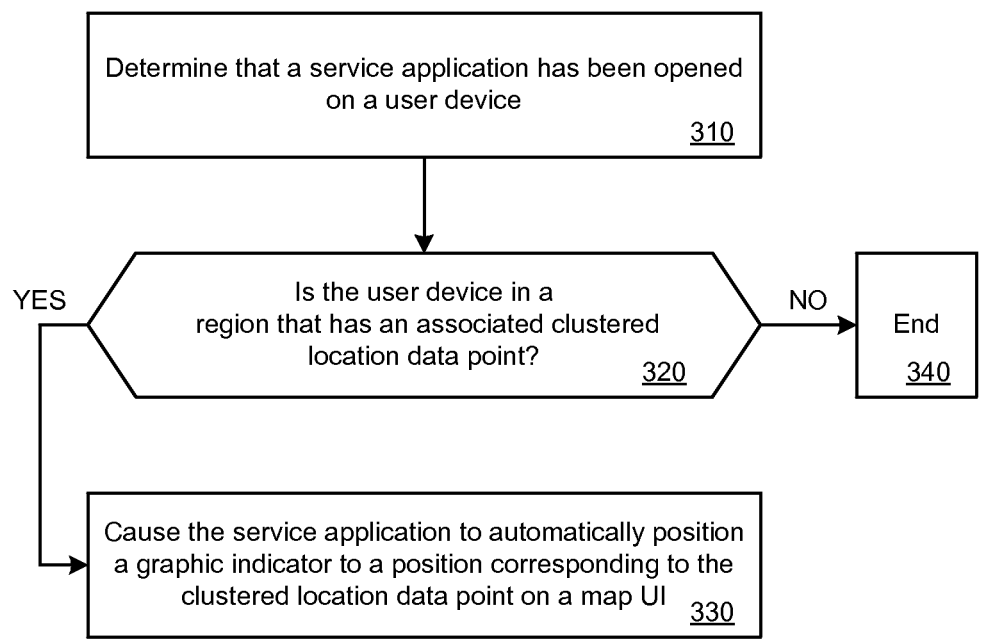
FIG. 3 illustrates an example method for providing a clustered location data point to a user device, under an embodiment.

FIG. 3 illustrates an example method for providing a clustered location data point to a user device, under an embodiment. A method such as described by an embodiment of FIG. 3 can be implemented using, for example, components described with an embodiment of FIG. 1. Accordingly, references made to elements of FIG. 1 are for purposes of illustrating a suitable element or component for performing a step or sub-step being described.

For example, FIG. 3 illustrates a method performed by the system 100 in order to cause a client service application to automatically display a pin (such as the pin 290 illustrated in FIG. 2C) on a map user interface. The system 100 can detect that the client service application has been opened or activated on a user's device (310). According to some examples, when the service application is opened or activated on the user's device, the service application can transmit information to the system 100, such as a current location of the user's device, the device ID, and/or the user ID associated with the user's device.

The system 100 can receive the current location of the user's device and determine whether the device is in a region that has an associated clustered location data point (320). For example, the system 100 can access the cluster mapping table in order to determine whether the current location is in a region specified in a cluster entry. If yes, the system 100 can identify the clustered location data point corresponding to the region, and transmit the clustered location data point to the user's device. In this manner, the system 100 can cause the service application on the user's device to automatically position, on the map user interface, a pin to a position corresponding to the clustered location data point (330). On the other hand, if no clustered location data point is specified for the current location of the user's device, the system 100 would not cause the service application to position the pin to a specified location (340). For example, the service application can display the pin at a default position (e.g., such as the user's current location data point).

In this manner, when the user is in a specified region and opens or activates the service application, the graphic pin can be automatically moved to or positioned at a position corresponding to a suitable pickup location that is based on the user's previous service requests (and/or other users' previous service requests). This can enable the user to make a request for the on-demand service without having to manually select a suitable pickup location beforehand. If the clustered location data point is not the location the user would like, he or she can simply move the pin to another location via user input or input an address or a landmark specifying the preferred pickup location.

Figure 4A:
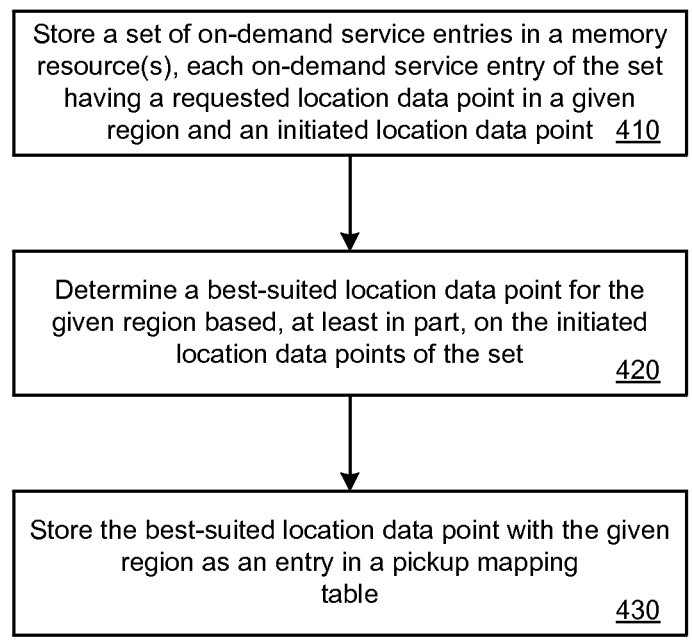
FIG. 4A illustrates an example method for determining a suitable or best-suited location for performing an on-demand service, according to an embodiment.

FIG. 4A illustrates an example method for determining a suitable or best-suited location for performing an on-demand service, according to an embodiment. A method such as described by an embodiment of FIG. 4A can be implemented using, for example, components described with an embodiment of FIG. 1. Accordingly, references made to elements of FIG. 1 are for purposes of illustrating a suitable element or component for performing a step or sub-step being described.

The system 100 can store a plurality of on-demand service entries (e.g., trip entries) in a memory resource, including a set of on-demand service entries for a given region (410). Each on-demand service entry in the set has a requested location data point in the given region and an initiated location data point. As described herein, an initiated location data point corresponds to a location of a service provider when the service provider initiated performance of the on-demand service for the user. For example, for a transport service, the initiated location data point can correspond to a location where the driver was when the user entered the vehicle and/or when the driver provided input via the driver service application that transport service had started. In another example, for a delivery service, the initiated location data point can correspond to a location where the service provider received or picked up a product for delivery.

Depending on implementation, the system 100 can perform one or more clustering processes, such as k-means clustering, in order to group on-demand service entries together based on requested location data points and to determine regions for the groups. In another variation, the system 100 can use the same groups or regions previously determined and specified in cluster entries in a cluster mapping table or database. Still further, in another example, the system 100 can perform one or more clustering processes in order to group on-demand service entries together based on initiated location data points and to determine regions for the groups. For example, the system can perform clustering processes on the initiated location data points to first determine groups of initiated location data points and then determine, for each group of initiated location data points, the associated requested location data points. In this manner, each group of initiated location data points can have an associated group of requested location data points.

In addition, by performing one or more clustering processes, the system 100 can determine a best-suited location data point for the on-demand service based, at last in part, on the initiated location data points of the set of on-demand service entries for the given region (e.g., based on historical data) (420). According to some examples, the system 100 can determine a sub-set of the set of on-demand service entries that have initiated location data points indicated by users as being a suitable or accurate initiation location for the on-demand service. From the sub-set, the system 100 can identify a corresponding sub-set of initiated location data points and perform one or more clustering processes to determine a best-suited location data point. Still further, the system 100 can determine the best-suited location data point using map data.

The system 100 can then generate and store an entry for the best-suited initiated location data point with a given region in a mapping table (e.g., a pickup mapping table) (430). The system 100 can also associate text and/or an image(s) with the initiated location data point in a corresponding entry. Such entries can be used by the system 100 to assist service providers to travel to the best location for initiating on-demand services.

Figure 4B:
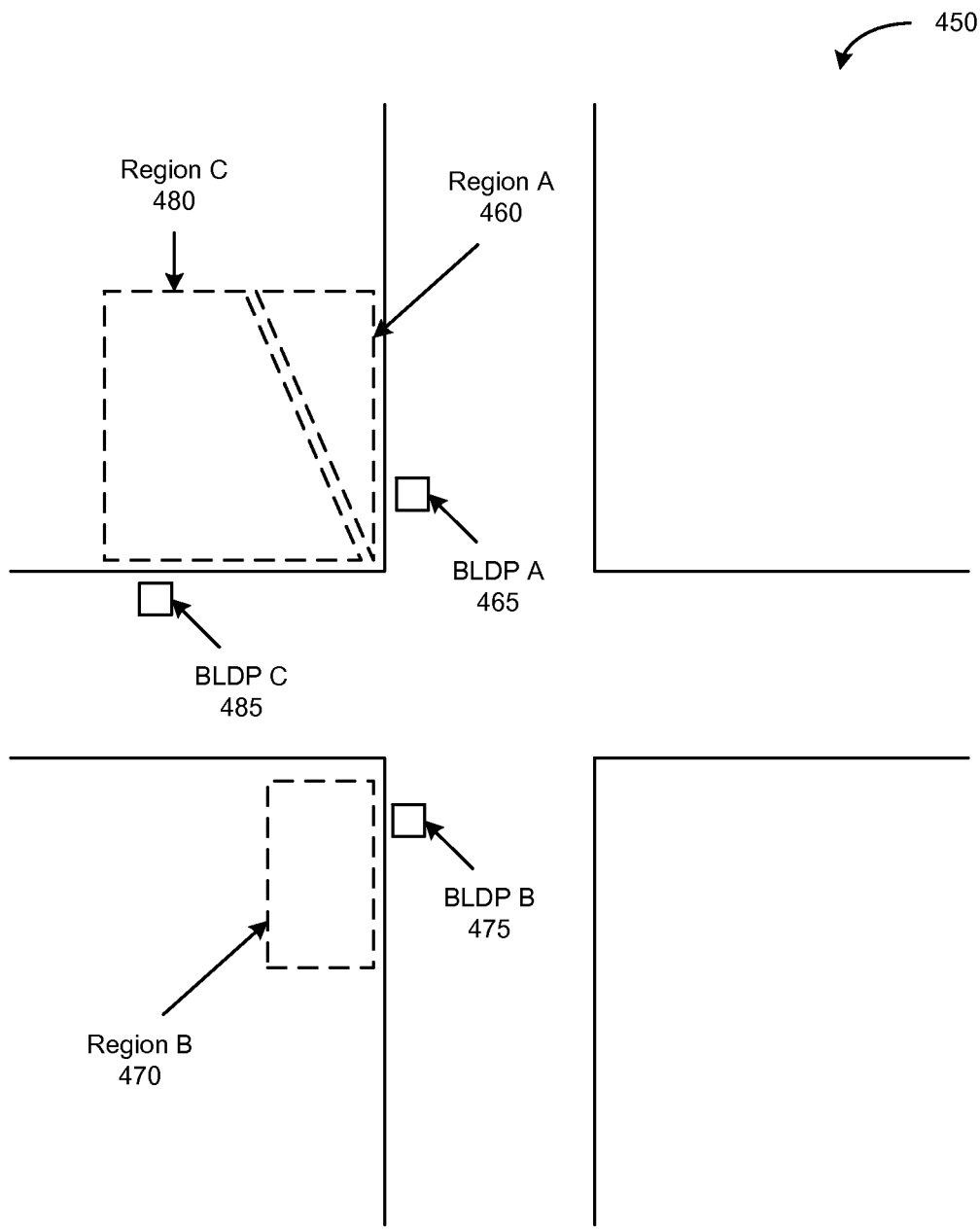
FIG. 4B illustrates an example diagram depicting regions and predetermined best-suited location data points.

FIG. 4B illustrates an example diagram depicting regions and predetermined best-suited location data points for those regions. In one example, the diagram 450 graphically illustrates a plurality of entries created by the system 100 as described in the method of FIG. 4A. For example, the entries can correspond to the pickup entries 167 stored in the pickup mapping database 165 as described in FIG. 1. In this case, the diagram 450 illustrates three such entries that each associates a region with a best-suited location data point.

The diagram 450 illustrates an area corresponding to an intersection of two streets. According to an example, for purposes of simplicity, the area illustrated in the diagram 450 can be the same area shown in the diagram 250 of FIG. 2B. The diagram 450 illustrates that the system 100 has determined three regions in the area, Region A 460, Region B 470, and Region C 480, and a best-suited location data points (BLDP) for each region, BLDP A 465, BLDP B 475, BLDP C 485, respectively. In this manner, three corresponding entries have been created, with each entry identifying a region (e.g., using a region ID, using three or more location data points for the perimeter of the region, etc.) and a corresponding BLDP (e.g., a latitude and a longitude coordinate). In addition, in some examples, one or more entries can include associated information for the BLDP.

While the area may include additional regions, for purposes of simplicity, only three regions are illustrated in the diagram 450. Still further, depending on variations, one or more regions can be the same regions as previously determined with respect to the clustered location data point, such as described in FIGS. 2A and 2B (see Region B, for example).

The regions shown in the diagram 450 indicate that when an on-demand service request is made with a requested location data point within a specified region, the system 100 can select a driver and provide the corresponding BLDP to the driver's device (e.g., as opposed to the requested location data point or concurrently with the requested location data point, depending on implementation). For example, if a user makes a transport service request specifying a pickup location data point in Region A 460, the system 100 can receive the request, select a driver to perform the transport service, and transmit an invitation to the selected driver's device. As opposed to transmitting the requested pickup location data point, the system 100 can transmit (e.g., along with the invitation or after the driver accepts the invitation) the associated BLDP A 465 to the driver device. The BLDP A 465 can provide a more accurate and more suitable location data point for the driver to travel to as the BLDP A 465 would be shown as a point on a road (contrasted with a location data point that is within a building as depicted on a map).

Figure 4C:
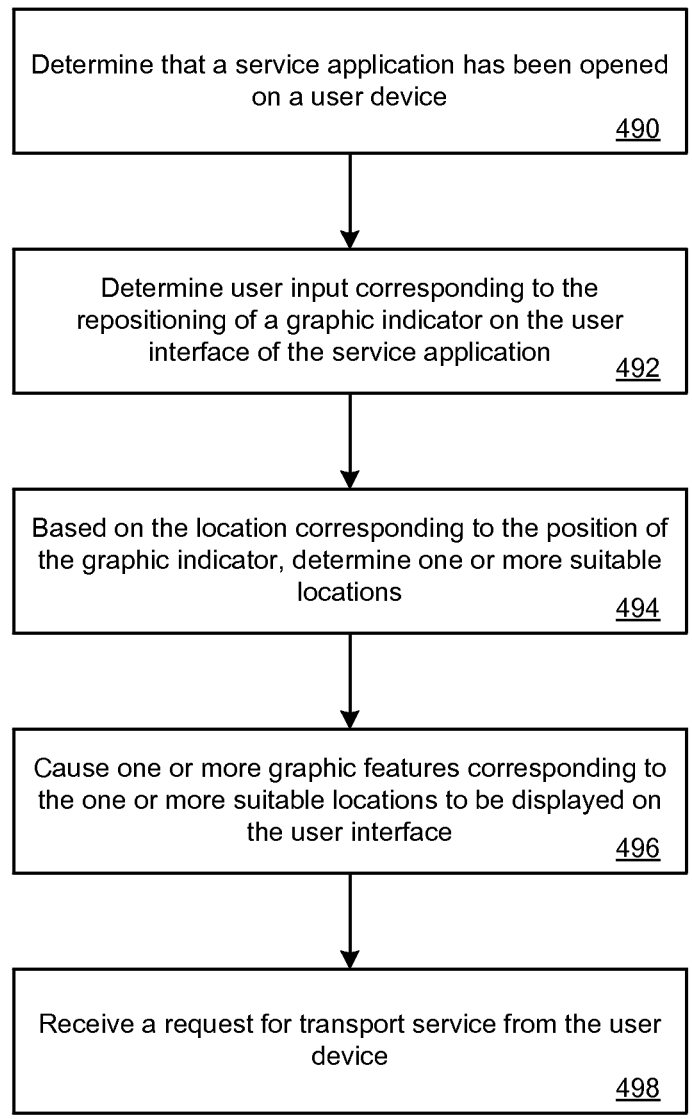
FIG. 4C illustrates an example method for providing a suitable or best-suited location to a user device, under an embodiment.

FIG. 4C illustrates an example method for providing a suitable or best-suited location to a user device, under an embodiment. A method such as described by an embodiment of FIG. 4C can be implemented using, for example, components described with an embodiment of FIG. 1. Accordingly, references made to elements of FIG. 1 are for purposes of illustrating a suitable element or component for performing a step or sub-step being described.

According to some examples, the system 100 can use data determined from analyzing historical pickup locations and/or historical initiated locations to provide suggested locations for a user. For example, the system 100 can store, in memory resources, a database that includes a plurality of cluster entries, where each cluster entry corresponds to a clustered location data point that is associated with a group of initiated pickup locations or region (or alternatively, a group of requested pickup locations). In some examples described herein, the clustered initiated location data point can be mapped to a particular streets using map data.

Referring to FIG. 4C, the system 100 can determine that a client service application has been opened or launched on the user device (490). When the service application is launched on the user device, the service application establishes a connection with the system 100 over one or more networks and provides a communication message indicating the status of the service application and/or user information (including the user location determined from the GPS receiver of the user device).

The system 100 can determine that user input has been made by the user corresponding to the repositioning or moving of a graphic indicator (e.g., the pin) on the map user interface of the service application (492). For example, the user may move the pin by providing user input on the map user interface (e.g., touch input via a touch-sensitive screen of the user device) in order to specify a pickup location. As the user provides user input to reposition or move the pin on the map user interface of the service application, the system 100 can receive information about the user input (e.g., that the user is repositioning the pin) and/or the location corresponding to the position of the pin on the map user interface (e.g., "the pin location").

Based on the pin location, the system 100 can determine the one or more clustered initiated location data points that are within a predetermined distance of that location (or within a region of the pin location) by identifying cluster entries (494). The predetermined distance can be user-configured by an administrative user of the system 100 (e.g., 100 or 200 meters from the pin location). A clustered initiated location data point, as described herein, can correspond to a suitable location that would be efficient for the user's transport service, as it represents a location in which previous transport services had begun. The system 100 can cause one or more graphic features corresponding to the one or more suitable locations to be displayed on the map user interface of the user device (496). For example, the system 100 can provide the one or more clustered initiated location data points to the client application, so that the client application can display one or more corresponding graphic indicators on the map user interface.

As an addition or an alternative, the system 100 can provide a set of clustered initiated location data points that are in a large area where the user is located (e.g., 1 mile or 2 miles from the user's location). For example, when the service application is initially opened, the system 100 can provide the set of clustered initiated location data points in the large area to the service application. The service application can store the data locally and when the user provides input to reposition the pin, the service application can display a sub-set of the set of clustered initiated location data points based on the pin location as graphic features on the map user interface. In this example, the suggested pick up locations can be pre-loaded so as to reduce wait times or delays as a result of latency when the user repositions the pin frequently in a short amount of time.

As the user continues to move the pin location, the system 100 can continue to provide updated one or more clustered initiated location data points to the service application so that the service application can dynamically display the graphic features corresponding to the one or more clustered initiated location points. The user can place the pin on one of the graphic features to specify as a pickup location for a request for the transport service and can make a request for a transport service. The system 100 can receive a request for the transport service from the user device (498). The request can include the pickup location, which can correspond to an arbitrary location or a clustered initiated location data point, depending on the user's input.

Figure 5:
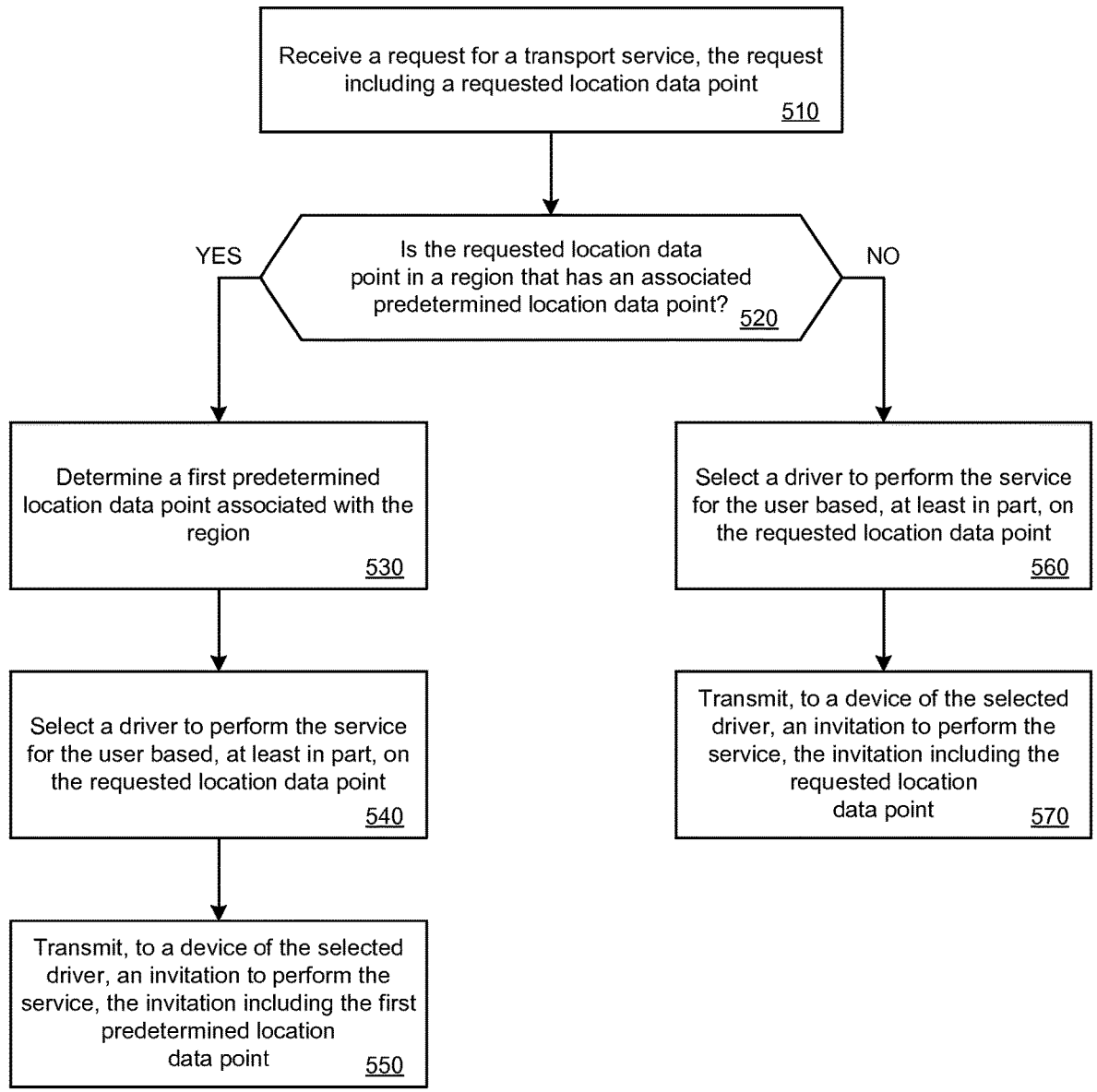
FIG. 5 illustrates an example method for arranging an on-demand service for a user, according to an embodiment.

FIG. 5 illustrates an example method for arranging an on-demand service for a user, according to an embodiment. A method such as described by an embodiment of FIG. 5 can be implemented using, for example, components described with an embodiment of FIG. 1. Accordingly, references made to elements of FIG. 1 are for purposes of illustrating a suitable element or component for performing a step or sub-step being described.

The system 100 can receive a request for a transport service from a user operating a client device (510). The request can include a requested pickup location data point, as well as other information, such as the user's ID, device ID, etc. In response to receiving the request, the system 100 can determine whether the requested pickup location data point is within a region that has an associated predetermined location data point (520). As described herein, a predetermined location data point can correspond to a best-suited location data point that was previously determined by the system 100 by performing one or more operations on historical data of previous transport services. Alternatively, the system 100 can determine whether the requested pickup location data point has a corresponding predetermined location data point.

For example, in reference to FIG. 1, the dispatch 110 can perform a look up process or search operation in the pickup mapping database 165 to determine whether any pickup entries 167 specifies a region that the requested pickup location data point is positioned in. If the requested location data point is not in a region with an associated predetermined location data point, the dispatch 110 can continue with default operations, in which the dispatch 110 can select a driver to perform the transport service for the user based, at least in part, on the requested location data point, as well as based on other factors, such as the current locations of the drivers in the area (e.g., within a radius of the requested location data point), the status of the drivers in the area, etc. (560). The dispatch 110 can then transmit, to the selected driver's device, an invitation to perform the transport service for the user (570). The invitation can include the requested location data point so that the driver service application operating on the driver's device can use the requested location data point to inform the driver where the driver would have to travel to if he or she were to accept the invitation.

On the other hand, if the dispatch 110 identifies a pickup entry 167 that specifies a region that the requested pickup location data point is positioned in, the dispatch 110 can determine the corresponding predetermined location data point associated with the region (530). The driver select component can select a driver to perform the transport service for the user based, at least in part, on the requested location data point (540). As an addition or an alternative, the system 100 can perform a driver selection process based, at least in part, on the predetermined location data point.

Once a driver is selected, the dispatch 110 can transmit, to the selected driver's device, an invitation to perform the transport service, including the predetermined location data point, as opposed to the requested location data point (550). In another example, the invitation can also include the requested location data point. The driver service application operating on the driver's device can display information about the invitation and enable the driver to reject/ignore the invitation or accept the invitation via user input.

Alternatively, the dispatch 110 can transmit the invitation to the driver's device with the requested pickup location data point, and the driver service application operating on the driver's device can (i) perform a reverse geocoding process to identify a corresponding address for the requested pickup location data point, and (ii) display information about the invitation using the corresponding address. After the driver accepts the invitation, the dispatch 110 can transmit the predetermined location data point to the driver's device to enable the driver service application to assist or guide the driver using the predetermined location data point.

In either implementation, once the driver accepts the invitation, the driver service application can display a map user interface showing the driver's current location, and in some examples, through interaction with another application (e.g., a map application or routing application), display a route and/or turn-by-turn directions from the driver's current location to the predetermined location data point. As an addition or an alternative, textual and/or graphical information associated (e.g., associated information) with the predetermined location data point can be provided to the driver's device to enable the driver service application to use the associated information to further inform the driver as to the precise location to travel to. For example, when the driver accepts the invitation, the driver service application can display (e.g., concurrently with the map user interface, route, and/or turn-by-turn directions) textual information associated with the predetermined location data point (e.g., "Pull Over On $10^{th}$ St. Just After Passing Market St."). In another example, the driver service application can display associated information when it determines that the driver is a predetermined time and/or distance away from the predetermined location data point.

While FIG. 5 illustrates step 540 and/or step 560 to be performed after step 520, in other examples, the system 100 can perform a driver selection process after receiving a request for a transport service (step 510) and before determining whether the requested location data point is in a region that has an associated predetermined location data point (step 520). In another example, the system 100 can perform a driver selection process concurrently with determining whether the requested location data point is in a region that has an associated predetermined location data point (step 520).

For illustrative purposes, a use case scenario example is described below with respect to the method of FIG. 5. A user can be at San Francisco International Airport (SFO) and want a transport service to a destination (e.g., her home). The user may have arrived from a flight and may have made her way towards an exit in the arrivals terminal (on the 2nd level of SFO). When the user makes a request with a requested pickup location data point at this location, the system 100 can determine whether the requested pickup location data point is within a predefined region that has an associated predetermined location data point. In this example, the system 100 can determine that the requested pickup location is within a predefined region. The predefined region (e.g., corresponding to an area near the arrivals terminal on the 2nd level of SFO) can have an associated predetermined (and best-suited) location data point as well as associated textual and/or graphical information.

As a result of processing a prior set of completed trip entries associated with the predefined region, the system 100 can have determined that the best-suited location data point for initiating transport services (e.g., picking up users) in the predefined region is actually just outside the departures terminal on the 3rd level of SFO as opposed to the arrivals terminal on the 2nd level of SFO. In addition, in some cases, because portions of actual roads may be on different levels of height and may overlap each other (e.g., one may be on top of the other), merely providing the latitude and longitude coordinate for the best-suited location data point to the driver service application may not be completely helpful for the driver. Accordingly, the system 100 can also provide the associated textual and/or graphical information to the driver device to inform the driver device to, for example, "Pick Up the User at the Departures Terminal on 3rd Level."

Hardware Diagrams

Figure 6:
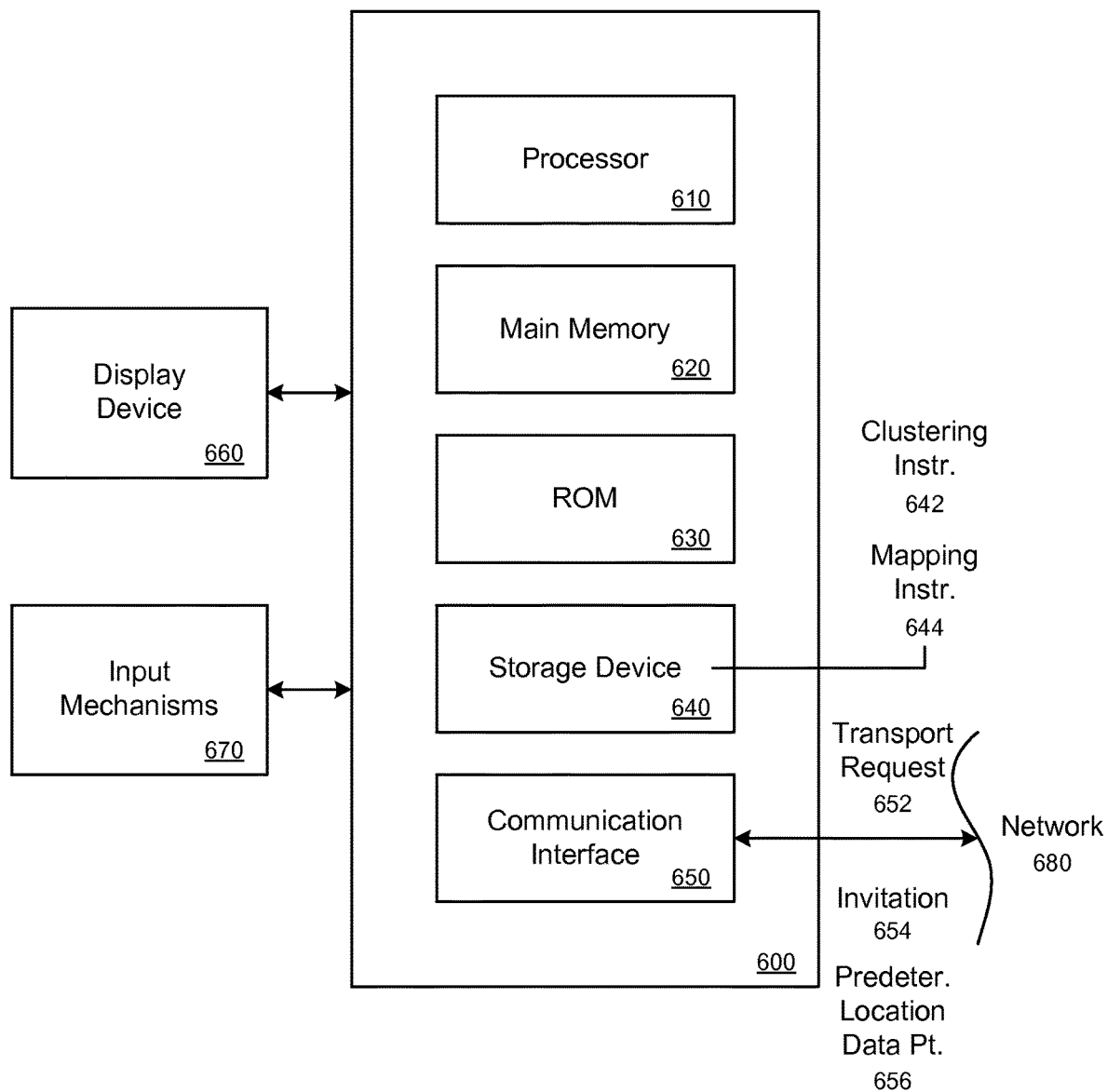
FIG. 6 is a block diagram that illustrates a computer system upon which embodiments described herein may be implemented.

FIG. 6 is a block diagram that illustrates a computer system upon which embodiments described herein may be implemented. For example, in the context of FIG. 1, the system 100 may be implemented using a computer system such as described by FIG. 6. The system 100 may also be implemented using a combination of multiple computer systems as described by FIG. 6.

In one implementation, a computer system 600 includes processing resources 610, a main memory 620, a read only memory (ROM) 630, a storage device 640, and a communication interface 650. The computer system 600 includes at least one processor 610 for processing information and the main memory 620, such as a random access memory (RAM) or other dynamic storage device, for storing information and instructions to be executed by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions, including clustering instructions 642 and mapping instructions 644.

For example, the processor 610 can execute the clustering instructions 642 to implement logic for (i) determining clustered location data points based on stored information about previously requested and/or completed transport services, and (ii) generating cluster entries associating regions with clustered location data points, such as described in FIGS. 1 through 3. The processor 610 can also execute the mapping instructions 644 to implement logic for (i) determining best-suited location data points based on stored information about previously initiated or at least partially performed transport services, and (ii) generating pickup entries associating regions with best-suited location data points, such as described in FIGS. 1 through 5.

The communication interface 650 can enable the computer system 600 to communicate with one or more networks 680 (e.g., cellular network) through use of the network link (wireless or wireline). Using the network link, the computer system 600 can communicate with one or more other computing devices and/or one or more other servers or datacenters. In some variations, the computer system 600 can receive a transport request 652 from a client device of a user via the network link. The transport request 652 can include the user's user ID, a requested pickup location data point, a destination location data point, and/or a vehicle type selection.

The processor 610, through execution of instructions, can select a driver to perform the transport service for the requesting user. The computer system 600 can then transmit an invitation 654 to the selected driver's device over the network link. In some examples, if the requested pickup location data point is determined to be within a specified region having an associated predetermined (or best-suited) location data point, the computer device 600 can transmit (e.g., along with or after transmitting the invitation 654) the predetermined location data point 656 to the selected driver's device. The driver service application operating on the driver's device can use the predetermined location data point 656 for purposes of assisting or guiding the driver to a precise and best-suited pickup location for the driver.

The computer system 600 can also include a display device 660, such as a cathode ray tube (CRT), an LCD monitor, or a television set, for example, for displaying graphics and information to a user. One or more input mechanisms 670, such as a keyboard that includes alphanumeric keys and other keys, can be coupled to the computer system 600 for communicating information and command selections to the processor 610. Other non-limiting, illustrative examples of input mechanisms 670 include a mouse, a trackball, touch-sensitive screen, or cursor direction keys for communicating direction information and command selections to the processor 610 and for controlling cursor movement on the display 660.

Examples described herein are related to the use of the computer system 600 for implementing the techniques described herein. According to one embodiment, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
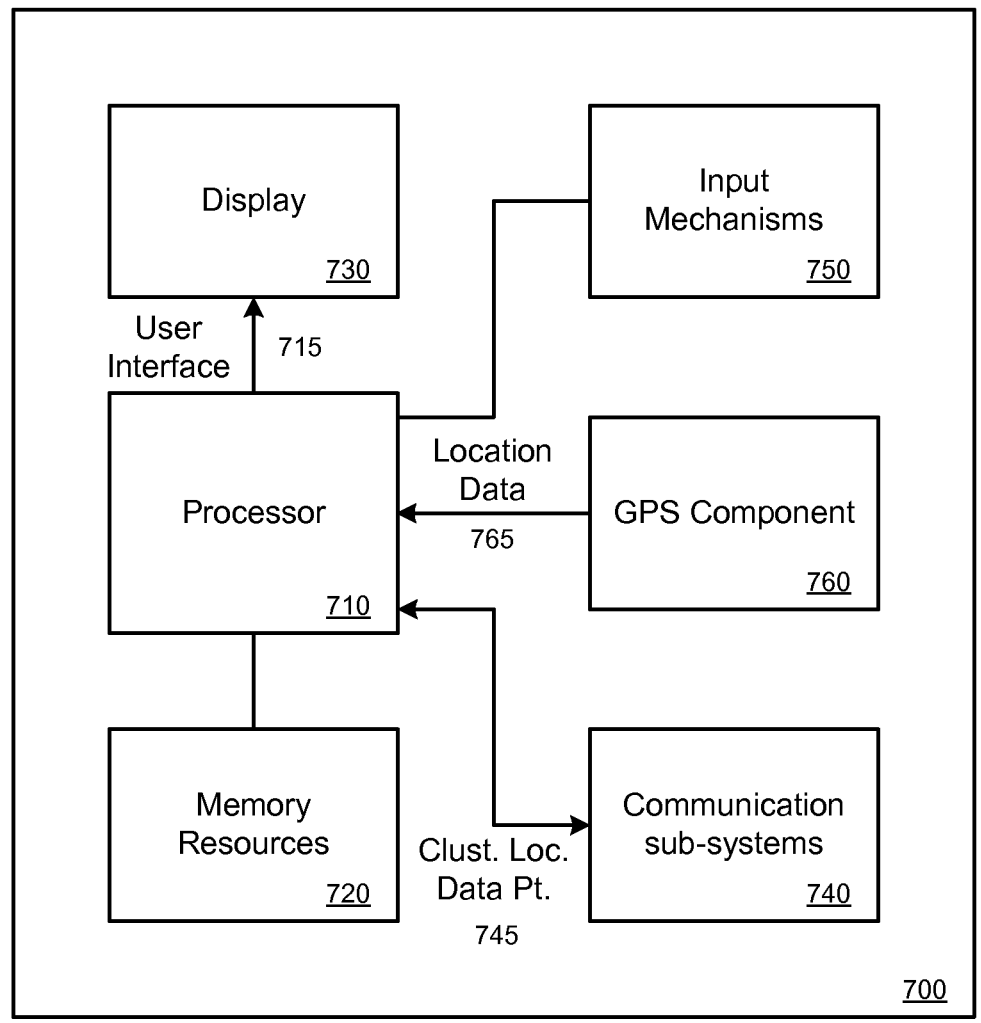
FIG. 7 is a block diagram that illustrates a mobile computing device upon which embodiments described herein may be implemented.

FIG. 7 is a block diagram that illustrates a mobile computing device upon which embodiments described herein may be implemented. In one embodiment, a computing device 700 may correspond to a mobile computing device, such as a cellular device that is capable of telephony, messaging, and data services. The computing device 700 can correspond to a client device or a driver device. Examples of such devices include smartphones, handsets or tablet devices for cellular carriers. The computing device 700 includes a processor 710, memory resources 720, a display device 730 (e.g., such as a touch-sensitive display device), one or more communication sub-systems 740 (including wireless communication sub-systems), input mechanisms 750 (e.g., an input mechanism can include or be part of the touch-sensitive display device), and one or more location detection mechanisms (e.g., GPS component) 770. In one example, at least one of the communication sub-systems 740 sends and receives cellular data over data channels and voice channels.

The processor 710 can provide a variety of content to the display 730 by executing instructions and/or applications that are stored in the memory resources 720. For example, the processor 710 is configured with software and/or other logic to perform one or more processes, steps, and other functions described with implementations, such as described by FIGS. 1 through 6, and elsewhere in the application. In particular, the processor 710 can execute instructions and data stored in the memory resources 720 in order to operate a service application, as described in FIGS. 1 through 6. Still further, the processor 710 can cause one or more user interfaces 715 to be displayed on the display 730, such as one or more user interfaces provided by the service application.

A user can operate a client device (such as the computing device 700) to operate the service application in order to make a request for a transport service. In one example, when the user opens or activates the service application on the computing device 700, the service application can (i) automatically retrieve or receive a location data point 795 (such as a location data point corresponding to the current location of the computing device 700 that is determined from the GPS component 770), and (ii) provide the location data point 795 to the transport arrangement system (not shown in FIG. 7). The transport arrangement system can wirelessly transmit a clustered location data point 745, if any, to the computing device 700 via the communication sub-systems 740, such as described in FIGS. 1 through 3. Such a clustered location data point 745 can be associated with a region that encompasses the coordinate of the location data point 795. According to some examples, the processor 710 can execute the instructions for the service application to cause the service application to display a map user interface 715 showing a graphic pin that is positioned at a location corresponding to the clustered location data point 745.

While FIG. 7 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method of arranging a transport service, the method being performed by a network computing system and comprising:
communicating, by the network computing system and over one or more networks, with a service application executing on mobile computing devices of a plurality of users, to (i) receive a plurality of transport requests, and (ii) determine which of the plurality of transport requests have been completed;
providing, by the network computing system and over the one or more networks, a map interface on a mobile computing device of a user of the plurality of users, the map interface including (i) a selectable feature which the user can select to cause the mobile computing device to transmit a transport request, and (ii) a graphic indicator that is moveable on the map interface;
detecting a user input that causes the graphic indicator to be positioned on the map interface to indicate a requested pickup location;
determining historical location information associated with the requested pickup location from completed transport requests of other users of the plurality of users;
selecting, by the network computing system, a pickup location based at least in part on the determined historical location information of the other users;
in response to detecting the user input, causing, by the network computing system and over the one or more networks, the graphic indicator to be dynamically displayed on the map interface, including (i) automatically moving the graphic indicator to the selected pickup location so as to identify the selected pickup location as the pickup location of the transport request, and (ii) using the graphic indicator to provide the user a visual feedback that is indicative of the selected pickup location being different than the requested pickup location; and
enabling the user to provide input for the selectable feature to cause the mobile computing device to transmit a corresponding transport request that automatically specifies the selected pickup location as the pickup location for the corresponding transport request.

2. The method of claim 1, wherein selecting the pickup location includes:
determining a set of pickup locations in a given region associated with the requested pickup location by accessing a mapping table stored in one or more memory resources of the network computing system, the mapping table including one or more individual entries that individually associate a specified region with at least one corresponding selected pickup location of the set of pickup locations.

3. The method of claim 2, wherein the requested pickup location is a current location of the user, and wherein selecting the pickup location further includes:
determining the selected pickup location is within predefined distance of the current location of the user.

4. The method of claim 1, further comprising:
transmitting to a driver device of a driver selected to provide the transport service for the user, the selected pickup location.

5. The method of claim 1, further comprising:
determining the requested pickup location as being a current location of the user.

6. The method of claim 5, further comprising:
causing the service application executing on the mobile computing device of the user to approximate the current location of the user by using a geo-aware resource of the mobile computing device.

7. The method of claim 1, wherein the historical location information includes historical requested pickup locations and historical initiated pickup locations from completed transport requests of each user of the plurality of users.

8. A network computer system comprising:
a memory resource that stores a set of instructions; and
one or more processors that execute the set of instructions to cause the one or more processors to:
communicate, by the network computer system and over one or more networks, with a service application executing on mobile computing devices of a plurality of users, to (i) receive a plurality of transport requests, and (ii) determine which of the plurality of transport requests have been completed;

provide, by the network computer system and over the one or more networks, a map interface on a mobile computing device of a user of the plurality of users, the map interface including (i) a selectable feature which the user can select to cause the mobile computing device to transmit a transport request, and (ii) a graphic indicator that is moveable on the map interface;

detect a user input that causes the graphic indicator to be positioned on the map interface to indicate a requested pickup location;

determine historical location information associated with the requested pickup location from completed transport requests of other users of the plurality of users;

select, by the network computer system, a pickup location based at least in part on the determined historical location information of the other users;

in response to detecting the user input, cause, by the network computer system and over the one or more networks, the graphic indicator to be dynamically displayed on the map interface, including to (i) automatically move the graphic indicator to the selected pickup location so as to identify the selected pickup location as the pickup location of the transport request, and (ii) use the graphic indicator to provide the user a visual feedback that is indicative of the selected pickup location being different than the requested pickup location; and enable the user to provide input for the selectable feature to cause the mobile computing device to transmit a corresponding transport request that automatically specifies the selected pickup location as the pickup location for the corresponding transport request.

9. The network computer system of claim 8, wherein the memory resource further stores a mapping table and wherein executing the set of instructions that cause the one or more processors to:

determine a set of pickup locations in a given region associated with the requested pickup location by accessing the mapping table stored in the memory resource, the mapping table including one or more entries that individually associate a specified region with at least one corresponding calculated pickup location of the set of pickup locations.

10. The network computer system of claim 8, wherein the requested pickup location is a current location of the user and wherein executing the set of instructions that cause the one or more processors to select the pickup location, further cause the one or more processors to:

determine the selected pickup location is within a predefined distance of the current location of the user.

11. The network computer system of claim 8, wherein the historical location information includes historical requested pickup locations and historical initiated pickup locations from completed transport requests of each user of the plurality of users.

12. A non-transitory computer readable medium that stores instructions, which when executed by one or more processors of a network computing system, cause the network computing to perform operations that include:

communicating, by the network computing system and over one or more networks, with a service application executing on mobile computing devices of a plurality of users, to (i) receive a plurality of transport requests, and (ii) determine which of the plurality of transport requests have been completed;

providing, by the network computing system and over the one or more networks, a map interface on a mobile computing device of a user of the plurality of users, the map interface including (i) a selectable feature which the user can select to cause the mobile computing device to transmit a transport request, and (ii) a graphic indicator that is moveable on the map interface;

detecting a user input that causes the graphic indicator to be positioned on the map interface to indicate a requested pickup location;

determining historical location information associated with the requested pickup location from completed transport requests of other users of the plurality of users;

selecting, by the network computing system, a pickup location based at least in part on the determined historical location information of the other users;

in response to detecting the user input, causing, by the network computing system and over the one or more networks, the graphic indicator to be dynamically displayed on the map interface, including (i) automatically moving the graphic indicator to the selected pickup location so as to identify the selected pickup location as the pickup location of the transport request, and (ii) using the graphic indicator to provide the user a visual feedback that is indicative of the selected pickup location being different than the requested pickup location; and enabling the user to provide input for the selectable feature to cause the mobile computing device to transmit a corresponding transport request that automatically specifies the selected pickup location as the pickup location for the corresponding transport request.

13. The non-transitory computer readable medium of claim 12, wherein selecting the pickup location includes:

determining a set of pickup locations in a given region associated with the requested pickup location by accessing a mapping table stored in one or more memory resources of the network computing system, the mapping table including one or more individual entries that individually associate a specified region with at least one corresponding selected pickup location of the set of pickup locations.

14. The non-transitory computer readable medium of claim 13, wherein the requested pickup location is a current location of the user, and wherein selecting the pickup location further includes:

determining the selected pickup location is within predefined distance of the current location of the user.

15. The non-transitory computer readable medium of claim 12, wherein the historical location information includes historical requested pickup locations and historical initiated pickup locations from completed transport requests of each user of the plurality of users.

* * * * *